(12) United States Patent
Nogawa

(10) Patent No.: US 8,680,710 B2
(45) Date of Patent: Mar. 25, 2014

(54) ANALOG POWER SEQUENCER AND METHOD

(75) Inventor: Masashi Nogawa, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 728 days.

(21) Appl. No.: 12/928,739

(22) Filed: Dec. 17, 2010

(65) Prior Publication Data

US 2012/0153992 A1    Jun. 21, 2012

(51) Int. Cl.
*H02J 1/10* (2006.01)

(52) U.S. Cl.
USPC ............. 307/43; 327/536; 327/544; 327/112; 327/530; 327/107; 307/80; 307/81; 307/106; 307/109; 330/297; 326/83; 326/30; 326/27; 708/276

(58) Field of Classification Search
USPC ........ 307/43, 81, 28, 75, 32; 327/143, 81, 82; 323/282; 370/901
See application file for complete search history.

(56) References Cited

U.S. PATENT DOCUMENTS

| | | | |
|---|---|---|---|
| 6,333,650 B1 | 12/2001 | Amin et al. | |
| 7,489,167 B2 * | 2/2009 | Goh | 327/143 |
| 7,630,841 B2 | 12/2009 | Comisky et al. | |
| 2007/0001514 A1* | 1/2007 | Marshall et al. | 307/28 |
| 2007/0152646 A1* | 7/2007 | Godil | 323/282 |
| 2008/0024108 A1 | 1/2008 | Jacob et al. | |

OTHER PUBLICATIONS

PCT Search Report mailed Aug. 28, 2012.

* cited by examiner

*Primary Examiner* — Rexford Barnie
*Assistant Examiner* — Jagdeep Dhillon
(74) *Attorney, Agent, or Firm* — William B. Kempler; Wade J. Brady, III; Frederick J. Telecky, Jr.

(57) ABSTRACT

Supply voltage sequencing circuitry includes a first sequencer (10-1) that produces an active level of a Power Good signal PG if a first supply voltage $V_{OUT1}$ exceeds an upper threshold $V_{90\%}$ while a control signal EN_PG is active, and produces an inactive level of PG if EN_PG is inactive. The PG level is latched when a control signal EN is inactive. A Power Down signal PD is produced if $V_{OUT1}$ is less than a lower threshold $V_{10\%}$ while EN is inactive. An active level of PD is produced when EN is active. A power-up sequence of supply voltages $V_{OUT1}$, $V_{OUT2}$, and $V_{OUT3}$ monitored by the first sequencer and similar second (10-2) and third (10-3) sequencers, respectively, is determined by connection of PG of each of the first and second sequencers to control the supply voltage monitored by the next sequencer. A desired power-down sequence of the supply voltages is determined by connections of the PDs of the first and second sequencers in the power-down sequence to EN_PG inputs and EN inputs of other sequencers, respectively, in accordance with a predetermined power-down algorithm.

21 Claims, 10 Drawing Sheets

ANALOG POWER SEQUENCER AND METHOD

BACKGROUND OF THE INVENTION

The present invention relates generally to simple, single-channel power sequencers, and more particularly to a simple analog single-channel supply voltage sequencer that senses the voltage of a particular supply voltage rail (i.e., conductor) and accordingly controls enabling and disabling of another supply voltage rail(s), and which can be interconnected with other like supply voltage sequencers to establish various desired sequences of enabling and disabling of a desired number of supply voltage rails.

A power engineer may need to deal with multiple supply voltage rails in an application wherein particular sequences of powering up and powering down the multiple supply voltage rails are required in order to achieve proper operation of devices powered by the supply voltage rails or in order to avoid damage to certain circuit components thereof. The multiple supply voltage rails typically are connected to the outputs of corresponding voltage regulator circuits, such as low drop out (LDO) voltage regulators.

The reason for providing the power-up and power-down sequencing is to prevent particular supply voltage rail(s) from being powered up simultaneously and to prevent particular supply voltage rail(s) from being powered down simultaneously. Various simple conventional supply voltage sequencers are known as "voltage monitors", "voltage supervisors", or "voltage detectors" such as the one shown in Prior Art FIG. 1. Examples of simple commercially available simple single-channel voltage monitors, and the like include the assignee's TPS3808 and TPS386000 and Analog Devices' ADM1085.

Much more complex supply voltage sequencers for sequencing a relatively large number of supply voltage rails also are commercially available. Such complex sequencers typically include digital processing circuitry, and are unacceptably costly for use in applications in which there are only a few supply voltage rails that need to be sequenced. Furthermore, some complex digital supply voltage sequencers contain state machines which may not be fail-safe in the presence of certain conditions such as electrical noise and during time intervals in which a supply voltage is significantly reduced. (For example, electrical noise may cause state registers inside the state machine to change state, and logic circuitry may lose logic information therein as a result of electrical noise.) Examples of more complex commercially available supply voltage sequencers include Texas Instruments' UCD9080 8-channel power supply sequencer and monitor, Linear Technology's LTC2924 quad power supply sequencer and Maxim's MAX16050 and MAX16051 sequencer circuits.

Prior Art FIG. 1 shows a conventional simple supply voltage control circuit of the kind typically referred to as a "voltage monitor", "voltage supervisor", or "voltage detector". In FIG. 1, an enable input of a first voltage regulator LDO#1 receives an input enable signal EN1 and generates a regulated output voltage $V_{OUT1}$ in response to enable signal EN1. A voltage regulator output signal $V_{OUT1}$ is applied to the input of a "supervisor I/C circuit" which generates another enable signal EN2, after a predetermined delay. Enable signal EN2 is applied to the input of a second voltage regulator LDO#2 which generates a second regulated output voltage $V_{OUT2}$. As indicated by the waveforms shown in FIG. 1, delay through the supervisor I/C circuit causes the powering up of $V_{OUT2}$ to be delayed relative to $V_{OUT1}$. A user of the power control circuit in Prior Art FIG. 1 may switch first enable input signal EN1 from a high state to a low state to "disable" $V_{OUT1}$, i.e., "power $V_{OUT1}$ down".

A disadvantage of the simple supply voltage control or sequencer circuit of Prior Art FIG. 1 is that it does not provide the ability to power-down $V_{OUT2}$ before powering down $V_{OUT1}$, which may be required in some applications. Furthermore, the supply voltage control circuit of Prior Art FIG. 1 also does not provide the ability to set a percentage of the threshold target voltage of $V_{OUT1}$, e.g., 10%, at which $V_{OUT1}$ is considered to be powered down.

Consequently, there is no capability for the user to wait until $V_{OUT1}$ falls to its 10% threshold level before beginning a power down of $V_{OUT2}$. Therefore, if a user wants the foregoing capabilities in a simple supply voltage sequencing system, the user must provide additional customized (and therefore expensive) circuitry in order to detect the 10% point of $V_{OUT1}$ and then generate EN2.

Thus, there is an unmet need for an inexpensive, simple, single-channel sequencer that can be interconnected with other like single-channel sequencers to provide multiple-channel sequencers that can provide various desired power-up sequences and various desired power-down sequences for multiple supply voltage rails, respectively.

There also is an unmet need for an inexpensive, simple, analog single-channel sequencer which is capable of monitoring the occurrence of pre-determined upper and lower threshold levels of a supply voltage rail.

There also is an unmet need for an inexpensive, simple, single-channel sequencer that can be interconnected with other like single-channel sequencers to provide multiple-channel sequencers which are capable of monitoring the occurrence of pre-determined upper and lower threshold levels of corresponding supply voltage rails and accordingly providing various desired power-up sequences and various desired power-down sequences for the corresponding supply voltage rails, respectively.

There also is an unmet need for an inexpensive, simple, single-channel sequencer that can be interconnected with other like single-channel sequencers to provide multiple-channel sequencers having only a desired number of channels, to avoid the cost of using complex digital multiple-channel sequencers which include more channels that are needed.

There also is an unmet need for an inexpensive, simple, single-channel sequencer that does not contain a state machine which may be subject to noise-induced logic errors.

SUMMARY OF THE INVENTION

It is an object of the invention to provide an inexpensive, simple, single-channel sequencer that can be interconnected with other like single-channel sequencers to provide multiple-channel sequencers that can provide various desired power-up sequences and various desired power-down sequences for multiple supply voltage rails, respectively.

It is another object of the invention to provide an inexpensive, simple, analog single-channel sequencer which is capable of monitoring the occurrence of pre-determined upper and lower threshold levels of a supply voltage rail.

It is another object of the invention to provide an inexpensive, simple, single-channel sequencer that can be interconnected with other like single-channel sequencers to provide multiple-channel sequencers which are capable of monitoring the occurrence of pre-determined upper and lower threshold levels of corresponding supply voltage rails and accordingly providing various desired power-up sequences and various desired power-down sequences for the corresponding supply voltage rails, respectively.

It is another object of the invention to provide an inexpensive, simple, single-channel sequencer that can be interconnected with other like single-channel sequencers to provide multiple-channel sequencers having only a desired number of channels, to avoid the cost of using complex digital multiple-channel sequencers which include more channels that are needed.

It is another object of the invention to provide an inexpensive, simple, single-channel sequencer that does not contain a state machine which may be subject to noise-induced logic errors.

Briefly described, and in accordance with one embodiment, the present invention provides supply voltage sequencing circuitry which includes a first sequencer (10-1) that produces an active level of a Power Good signal PG if a first supply voltage $V_{OUT1}$ exceeds an upper threshold $V_{90\%}$ while a control signal EN_PG is active, and produces an inactive level of PG if EN_PG is inactive. The PG level is latched when a control signal EN is inactive. A Power Down signal PD is produced if $V_{OUT1}$ is less than a lower threshold $V_{10\%}$ while EN is inactive. An active level of PD is produced when EN is active. A power-up sequence of supply voltages $V_{OUT1}$, $V_{OUT2}$, and $V_{OUT3}$ monitored by the first sequencer and similar second (10-2) and third (10-3) sequencers, respectively, is determined by connection of PG of each of the first and second sequencers to control the supply voltage monitored by the next sequencer in the power-sequence. A desired power-down sequence of the supply voltages is determined by connections of the PDs of the first and second sequencers in the power-down sequence to EN_PG inputs and EN inputs of other sequencers, respectively, in accordance with a predetermined power-down algorithm.

In one embodiment, the invention provides supply voltage sequencing circuitry including first circuitry (11) for comparing an upper target threshold ($V_{90\%}$) with a first supply voltage ($V_{OUT1}$) and second circuitry (7) for comparing a lower target threshold ($V_{10\%}$) with the first supply voltage ($V_{OUT1}$). The first logic circuitry (39,24,22,2,50,29) produces an active level of a first output signal (PG) on a first output (PG) in response to an output (18) of the first circuitry (11) if the first supply voltage ($V_{OUT1}$) exceeds the upper target threshold ($V_{90\%}$) while a first control signal (EN_PG) on a first control input (EN_PG) is at an active level, the first logic circuitry (39,24,22,2,50,29) also being operative to produce an inactive level of the first output signal (PG) in response to an inactive level of the first control signal (EN_PG), the first logic circuitry (39,24,22,2,50,29) also being operative to latch a logic level representative of the first output signal (PG) when a second control signal (EN) on a second control input (EN) is at an inactive level. Second logic circuitry (30,23,4) produces an inactive level of a second output signal (PD) on a second output (PD) in response to the output (17) of the second circuitry (7) if the first supply voltage ($V_{OUT1}$) is less than the lower target threshold ($V_{10\%}$) during the inactive level of the second control signal (EN), the second logic circuitry (30,23,4) also being operative to produce an active level of the second output signal (PD) in response to the active level of the second control signal (EN).

In one embodiment, the first circuitry (11) includes a first comparator circuit (11) for comparing an upper target threshold ($V_{90\%}$) with a first supply voltage ($V_{OUT1}$), and the second circuitry (7) includes a second comparator circuit (7) for comparing a lower target threshold ($V_{10\%}$) with the first supply voltage ($V_{OUT1}$).

In one embodiment, the first logic circuitry (39,24,22,2,50, 29) includes a first ORing circuit (39) having a first input coupled to the output (18) of the first comparator circuit (11), a first ANDing circuit (29) having a first input (49) coupled to the second control signal (EN) and an output (31) coupled to a second input of the first ORing circuit (39), a second ANDing circuit (24) having a first input coupled to an output (38) of the first ORing circuit (39) and a second input (35) coupled to the first control signal (EN_PG), and an output (37) representative of the first output signal (PG) coupled to a second input (41) of the first ANDing circuit (29). The second logic circuitry (30,23,4) includes a second ORing circuit (30) having a first input coupled to the output (17) of the second comparator circuit (7), a second input coupled to the second control signal (EN), and an output (20) representative of the second output signal (PD).

In one embodiment, a first transistor (M40) has a gate coupled to the output (37) of the second ANDing circuit (24), a source coupled to a first reference voltage ($V_{EE}$), and a drain coupled to the first output signal (PG). A second transistor (M41) has a gate coupled to the output (20) of the second ORing circuit (30), a source coupled to the first reference voltage ($V_{EE}$), and a drain coupled to the second output signal (PD). The gate of the first transistor (M40) is coupled to the output (37) of the second ANDing circuit (24) by means of a rising-edge-only delay circuit (22). The gate of the second transistor (M41) is coupled to the output (20) of the second ORing circuit (30) by means of a falling-edge-only delay circuit (23). A pull-down transistor (M3) has a source coupled to the first reference voltage ($V_{EE}$), a gate coupled to the first input (49) of the first ANDing circuit (29), and a drain coupled to the first supply voltage ($V_{OUT1}$).

In a described embodiment, a first (+) input of the first comparator circuit (11) is coupled to a scaled-down representation ($V_{PG\_SENSE}$) of the first supply voltage ($V_{OUT1}$), a second (−) input of the first comparator circuit (11) is coupled to a second reference voltage (V2) representative of an upper percentage of a target value of the first supply voltage ($V_{OUT1}$), a first (+) input of the second comparator circuit (7) is coupled to the first supply voltage ($V_{OUT1}$), and a second (−) input of the second comparator circuit (7) is coupled to a third reference voltage ($V_{REF\_PD}$) representative of a lower percentage of the target value of the first supply voltage ($V_{OUT1}$).

In one embodiment, an enable delay circuit (45) has a first input (EN_PG) coupled to the second output signal (PD), a second input (SET) coupled to receive an external enable signal (EN_EXT), and an output (46) for conducting a voltage regulator enable signal (PG).

In one embodiment, the first logic circuitry (39,24,22,2,50, 29) includes a first delay circuit (22) coupled in a first circuit path between the output (18) of the first comparator circuit (11) and the first output signal (PG), wherein the first delay circuit (22) is selected from the group comprising a rising-edge-only delay circuit and a falling-edge-only delay circuit. The second logic circuitry (30,23,4) includes a second delay circuit (23) coupled in a second circuit path between the output (17) of the second comparator circuit (7) and the second output signal (PD), wherein the second delay circuit (23) is selected from the group comprising a rising-edge-only delay circuit and a falling-edge-only delay circuit.

In one embodiment, the first comparator circuit (11), second comparator circuit (7), first logic circuitry (39,24,22,2, 50,29), and second logic circuitry (30,23,4) are included in a first sequencer (10-1) for monitoring the first supply voltage ($V_{OUT1}$). The supply voltage sequencing circuitry (100-1,2,3) also includes second (10-2) and third (10-3) sequencers each also including a first comparator circuit (11), a second comparator circuit (7), first logic circuitry (39,24,22,2,50,29), and the second logic circuitry (30,23,4), as in the first sequencer (10-1). The first (51-1), second (51-2), and third (51-3) voltage regulators each having a an enable input, an output of the first voltage regulator (51-1) producing the first supply voltage ($V_{OUT1}$) for the first sequencer (10-1), an output of the second voltage regulator (51-2) producing a second supply voltage ($V_{OUT2}$) for being monitored by the second sequencer (10-2), and an output of the third voltage regulator (51-3) producing a third supply voltage ($V_{OUT3}$) for being monitored by the third sequencer (10-3). The first output signal (PG1) of the first sequencer (10-1) is coupled to the enable input of the second voltage regulator (51-2), and the first output signal (PG2) of the second sequencer (10-2) is coupled to the enable input ( ) of the third voltage regulator (51-3).

In one embodiment, the first sequencer (10-1) is the first sequencer in a power-up sequence of the first ($V_{OUT1}$), second ($V_{OUT2}$), and third ($V_{OUT3}$) supply voltages and also is the first sequencer in a power-down sequence of the first ($V_{OUT1}$), second ($V_{OUT2}$), and third ($V_{OUT3}$) supply voltages. The second output signal (PD) of the first sequencer in the power-down sequence is coupled to (a) the first control input (EN_PG) of a sequencer (10-1 in FIG. 8) the first output (PG) of which drives the enable input of the voltage regulator producing the supply voltage which is monitored by a second sequencer in the power-down sequence, and (b) the second input (EN) of the second sequencer in the power-down sequence. The second output signal (PD) of the second sequencer in the power-down sequence is coupled to the first control input (EN_PG) of a sequencer the first output (PG) of which drives an enable input of the voltage regulator producing the supply voltage which is monitored by a third sequencer in the power-down sequence. The second output signal (PD) of the second sequencer in the power-down sequence is also coupled to the second control input (EN) of the third sequencer in the power-down sequence. An external enable signal EN_EXT is coupled to the enable input of the first voltage regulator (51-1) and to the second control input (EN) of the first sequencer (10-1).

In one embodiment, the first sequencer (10-1) is the first sequencer in a power-up sequence of the first ($V_{OUT1}$), second ($V_{OUT2}$), and third ($V_{OUT3}$) supply voltages but is not the first sequencer in a power-down sequence of the first ($V_{OUT1}$), second ($V_{OUT2}$), and third ($V_{OUT3}$) supply voltages. The supply voltage sequencing circuitry (100-1,3) includes an enable delay circuit (45) having a first input (EN_PG), a second input (SET), and an output (PG) coupled to the enable input of the first voltage regulator (51-1). The second output signal (PD) of a first sequencer in the power-down sequence is coupled to the first control input (EN_PG) of a sequencer (45 in FIG. 3A, 10-1 in FIG. 5A) an output (PG) of which drives the enable input of the voltage regulator producing the supply voltage which is monitored by a second sequencer in the power-down sequence, and also is coupled to the second input (EN) of the second sequencer in the power-down sequence. The second output (PD) of the second sequencer in the power-down sequence is coupled to the first control input (EN_PG) of a sequencer the first output (PG) of which drives an enable input of the voltage regulator producing the supply voltage which is monitored by a third sequencer in the power-down sequence. The second output signal (PD) of the second sequencer in the power-down sequence is also coupled to the second control input (EN) of the third sequencer in the power-down sequence. An external enable signal (EN_EXT) is coupled to the second input (SET) of the enable delay circuit (45) and also is coupled to the first control input (EN_PG) of the sequencer the first output (PG) of which is coupled to the enable input of the voltage regulator which produces the supply voltage ($V_{OUT1}$, $V_{OUT2}$, or $V_{OUT3}$) being monitored by the first sequencer in the power-down sequence. The external enable signal (EN_EXT) also is coupled to the second control input (EN) of the first sequencer in the power-down sequence.

In one embodiment, the first sequencer (10-1) is the first sequencer in a power-up sequence of the first ($V_{OUT1}$), second ($V_{OUT2}$), and third ($V_{OUT3}$) supply voltages and also is the first sequencer in a power-down sequence of the first ($V_{OUT1}$), second ($V_{OUT2}$), and third ($V_{OUT3}$) supply voltages. The second output signal (PD1) of the first sequencer (10-1) is coupled to the first output signal (PG1) of the first sequencer (10-1) and to the second control signal (EN) of the second sequencer (10-2), the second output signal (PD2) of the second sequencer (10-2) is coupled to the first output signal (PG2) of the second sequencer (10-2) and to the second control signal (EN) of the third sequencer (10-3), and the second output signal (PD3) of the third sequencer (10-3) is coupled to the first output signal (PG3) of the third sequencer (10-3).

In a described embodiment, the enable delay circuit (45) includes a first NAND gate (56) having an output coupled to a first input of a second NAND gate (58), the second NAND gate having an output coupled to a first input of the first NAND gate (56), the output of the second NAND gate (58) being coupled to the enable input of the first voltage regulator (51-1), a second input of the first NAND gate (56) being coupled to an output of an OR gate (55), a second input of the second NAND gate (58) being coupled to an output of an inverter (57), a first input of the OR gate (55) being coupled to the second input (EN_PG) of the enable delay circuit (45), a second input of the OR gate (55) and an input of the inverter (57) being coupled to the first input (SET) of the enable delay circuit (45).

In one embodiment, the invention provides a method of generating signals for controlling powering up and powering down of a first supply voltage ($V_{OUT1}$) by means of a first sequencer (10-1), the method including monitoring an upper target threshold ($V_{90\%}$) of a first supply voltage ($V^{OUT1}$); producing an active level of a first output signal (PG) on a first output (PG) of the first sequencer (10-1) in response to the monitoring of the upper target threshold voltage ($V_{90\%}$) if the first supply voltage ($V_{OUT1}$) exceeds the upper target threshold ($V_{90\%}$) while a first control signal (EN_PG) on a first control input (EN_PG) of the first sequencer (10-1) is at an active level; monitoring a lower target threshold ($V_{10\%}$) of the first supply voltage ($V_{OUT1}$); producing an inactive level of a second output signal (PD) on a second output (PD) of the first sequencer (10-1) in response to the monitoring of a lower target threshold ($V_{10\%}$) if the first supply voltage ($V_{OUT1}$) is less than the lower target threshold ($V_{10\%}$) during an inactive level of a second control signal (EN) on a second control input (PG) of the first sequencer (10-1); producing an inactive level of the first output signal (PG) in response to an inactive level of the first control signal (EN_PG); and latching the level of the first output signal (PG) whenever the inactive level of the second control signal EN occurs.

In one embodiment, the method further includes controlling the powering up of the first supply voltage ($V_{OUT1}$), a second supply voltage ($V_{OUT2}$) and a third supply voltage ($V_{OUT3}$). The first ($V_{OUT1}$), second ($V_{OUT2}$), and third ($V_{OUT3}$) supply voltages are produced by first (51-1), second (51-2), and third (51-3) voltage regulators, respectively. The method further includes providing an enable signal to an enable input of the first voltage regulator (51-1) and providing the second control signal (EN) of the first sequencer (10-1), coupling the first output signal (PG) of the first sequencer (10-1) to an enable input of the second voltage regulator (51-2), and coupling the first output signal (PG) of the second sequencer (10-2) to an enable input of the third voltage regulator (51-3).

In one embodiment, wherein the first sequencer (10-1) is the first sequencer in a power-up sequence of the first ($V_{OUT1}$), second ($V_{OUT2}$), and third ($V_{OUT3}$) supply voltages but is not the first sequencer in a power-down sequence of the first ($V_{OUT1}$), second ($V_{OUT2}$), and third ($V_{OUT3}$) supply voltages, the method includes providing an enable delay circuit (45) having a first input (EN_PG), a second input (SET), and an output (PG) coupled to an enable input of the first voltage regulator (51-1); coupling the second output signal (PD) of a first sequencer in the power-down sequence to the first control input (EN_PG) of a sequencer (45 in FIG. 3A, 10-1 in FIG. 5A) an output (PG) of which drives the enable input of the voltage regulator producing the supply voltage which is monitored by a second sequencer in the power-down sequence, and also coupling the second output signal (PD) of the first sequencer in the power-down sequence to the second input (EN) of the second sequencer in the power-down sequence; coupling the second output signal (PD) of the second sequencer in the power-down sequence to the first control input (EN_PG) of a sequencer the first output (PG) of which drives an enable input of the voltage regulator producing the supply voltage which is monitored by a third sequencer in the power-down sequence; coupling the second output signal (PD) of the second sequencer in the power-down sequence to the second control input (EN) of the third sequencer in the power-down sequence; coupling an external enable signal (EN_EXT) to the second input (SET) of the enable delay circuit (45) and also to the first control input (EN_PG) of the sequencer the first output (PG) of which is coupled to the enable input of the voltage regulator which produces the supply voltage ($V_{OUT1}$, $V_{OUT2}$, or $V_{OUT3}$) being monitored by the first sequencer in the power-down sequence; and coupling the external enable signal (EN_EXT) to the second control input (EN) of the first sequencer in the power-down sequence.

In one embodiment wherein the first sequencer (10-1) is the first sequencer in a power-up sequence of the first ($V_{OUT1}$), second ($V_{OUT2}$), and third ($V_{OUT3}$) supply voltages and also is the first sequencer in a power-down sequence of the first ($V_{OUT1}$), second ($V_{OUT2}$), and third ($V_{OUT3}$) supply voltages, the method includes coupling the second output signal (PD) of a first sequencer in the power-down sequence to the first control input (EN_PG) of a sequencer (10-1 in FIG. 8) of the first output (PG) of which drives the enable input of the voltage regulator producing the supply voltage which is monitored by a second sequencer in the power-down sequence, and also coupling the second output signal (PD) of the first sequencer in the power-down sequence to the second input (EN) of the second sequencer in the power-down sequence; coupling the second output signal (PD) of the second sequencer in the power-down sequence to the first control input (EN_PG) of a sequencer the first output (PG) of which drives an enable input of the voltage regulator producing the supply voltage which is monitored by the third sequencer in the power-down sequence; coupling the second output signal (PD) of the second sequencer in the power-down sequence to the second control input (EN) of the third sequencer in the power-down sequence; and coupling an external enable signal EN_EXT to the enable input of the first voltage regulator (51-1) and to the second control input (EN) of the first sequencer (10-1).

In one embodiment wherein the first sequencer (10-1) is the first sequencer in a power-up sequence of the first ($V_{OUT1}$), second ($V_{OUT2}$), and third ($V_{OUT3}$) supply voltages and also is the first sequencer in a power-down sequence of the first ($V_{OUT1}$), second ($V_{OUT2}$), and third ($V_{OUT3}$) supply voltages, the method includes coupling the second output signal (PD1) of the first sequencer (10-1) to the first output (PG1) of the first sequencer (10-1) and to the second control input (EN) of the second sequencer (10-2); coupling the second output signal (PD2) of the second sequencer (10-2) to the first output (PG2) of the second sequencer (10-2) and to the second control input (EN) of the third sequencer (10-3); and coupling the second output signal (PD3) of the third sequencer (10-3) to the first output (PG3) of the third sequencer (10-3).

In one embodiment, the method provides a circuit (10) for generating signals for controlling powering up and powering down of a first supply voltage ($V_{OUT1}$), the circuit including means (11) for monitoring an upper target threshold ($V_{90\%}$) of a first supply voltage ($V_{OUT1}$); means (50,29,39,24,22,2, M40) for producing an active level of a first output signal (PG) on a first output (PG) of the first sequencer (10-1) in response to the monitoring of the upper target threshold voltage ($V_{90\%}$) if the first supply voltage ($V_{OUT1}$) exceeds the upper target threshold ($V_{90\%}$) while a first control signal (EN_PG) on a first control input (EN_PG) of the first sequencer (10-1) is at an active level; means (7) for monitoring a lower target threshold ($V_{10\%}$) of the first supply voltage ($V_{OUT1}$); means (30,23,4,M41) for producing an inactive level of a second output signal (PD) on a second output (PD) of the first sequencer (10-1) in response to the monitoring of a lower target threshold ($V_{10\%}$) if the first supply voltage ($V_{OUT1}$) is less than the lower target threshold ($V_{10\%}$) during an inactive level of a second control signal (EN) on a second control input (PG) of the first sequencer (10-1); means (24, 22,2,M40) for producing an inactive level of the first output signal (PG) in response to an inactive level of the first control signal (EN_PG); and means (29,39,24,22) for latching the level of the first output signal (PG) whenever the inactive level of the second control signal EN occurs.

DETAILED DESCRIPTION OF THE PREFERRED EMBODIMENTS

The invention provides a simple single-channel supply voltage sequencer, hereinafter simply referred to as a "single-channel sequencer", that is capable of managing one or more supply voltage rails in electronic systems. Two or more of the single-channel supply voltage sequencers can be interconnected in various ways to provide various multi-channel supply voltage sequencer systems that provide various power-up and power-down sequences.

Figure 1:
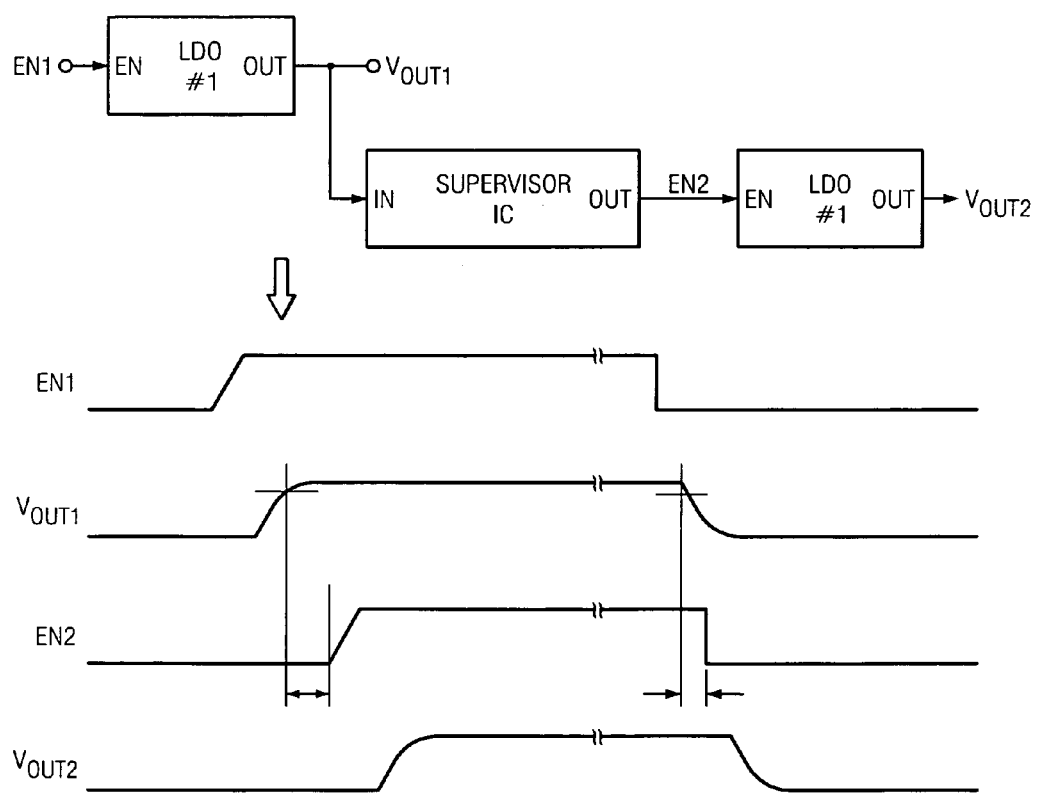
FIG. 1 is a busy block diagram of a conventional single-channel supply voltage sequencer and associated voltage rail ramp-up waveforms.
Figure 2:
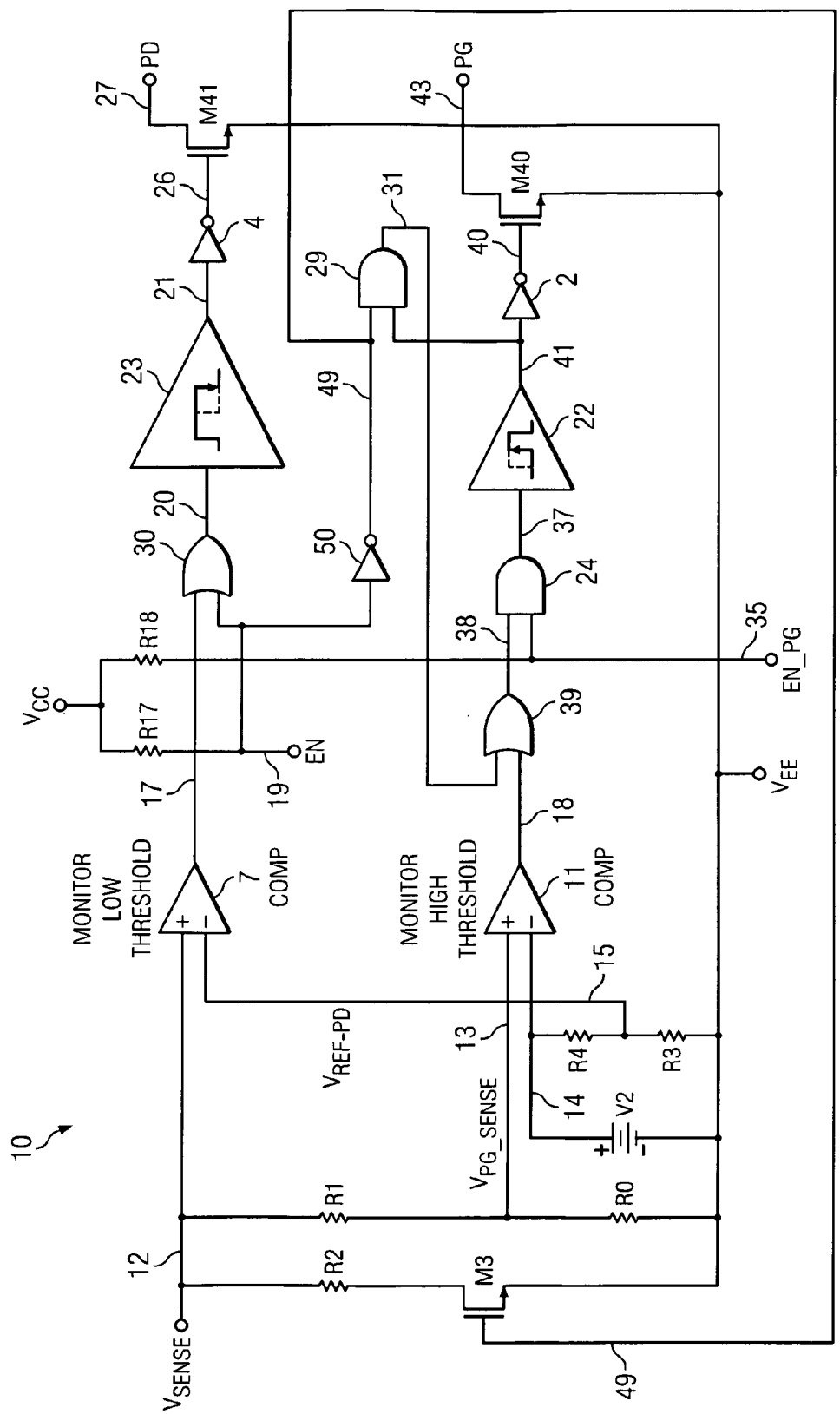
FIG. 2 is a schematic diagram of a single-channel supply voltage sequencer of the present invention.

FIG. 2 shows a single-channel supply voltage sequencer 10 that includes a "$V_{SENSE}$" input conductor 12 connected to the (+) input of a low threshold $V_{SENSE}$ monitoring comparator 7, hereinafter referred to as "low threshold comparator 7". Conductor 12 is connected to the output power rail of a voltage regulator to be monitored. The (−) input of low threshold comparator 7 is coupled by conductor 15 to the junction between resistors R3 and R4, which are connected in series between both terminals of a reference voltage source V2. Resistors R3 and R4 produce a power-down reference voltage $V_{REF\_PD}$ on conductor 15. The output of low threshold comparator 7 is connected by conductor 17 to one input of an OR gate 30, the other input of which is connected by conductor 19 to one terminal of a pull-up resistor R17, the other terminal of which is connected to $V_{CC}$. An active-high "enable" input signal EN is applied to conductor 19. Enable signal EN enables the "normal" functioning of single-channel sequencer 10. Conductor 19 also is connected to the input of inverter 50. The output of OR gate 30 is connected by conductor 20 to the input of a falling-edge-only delay circuit 23, the output of which is connected by conductor 21 to the input of an inverter 4. The output of inverter 4 is connected by conductor 26 to the gate of a N-channel MOS transistor M41, the drain of which is connected to conductor 27 and the source of which is connected to low supply voltage $V_{EE}$, which may be ground.

A resistor R1 is connected between conductor 12 and conductor 13 and a resistor R0 is connected between conductor 13 and $V_{EE}$. The voltage $V_{SENSE}$ on conductor 12 is divided by resistors R1 and R0 to produce a voltage $V_{PG\_SENSE}$ on conductor 13. Conductor 13 is connected to the (+) input of a high threshold $V_{SENSE}$ monitoring comparator 11, hereinafter referred to as "high threshold comparator 11". The (−) input of high threshold comparator 11 is connected by conductor 14 to the reference voltage V2. The output of high threshold comparator 11 is connected by conductor 18 to one input of OR gate 39. The other input of OR gate 39 is connected by conductor 31 to the output of a 2-input AND gate 29, one input of which is connected by conductor 49 to the output of inverter 50. The output 38 of OR gate 39 is connected to one input of a 2-input AND gate 24, the other input of which is connected by conductor 35 to one terminal of a pull-up resistor R18, the other terminal of which is connected to $V_{CC}$. An active-high "Enable Power-Good" or "enable PG" signal EN_PG is applied to conductor 35. The output of AND gate 24 is connected by conductor 37 and to one input of a rising-edge-only delay circuit 22, the output of which is connected by conductor 41 to the other input of AND gate 29 and to the input of inverter 2. The output of inverter 2 is connected by conductor 40 to the gate of a N-channel MOS transistor M40 having its drain connected to conductor 43 and its source connected to $V_{EE}$. Single-channel sequencer 10 generates an active-high "Power Good" signal PG on conductor 43 and an active-high "Power Down in Progress" signal PD on conductor 27.

A pull-down circuit including N-channel MOS transistor M3 and resistor R2 is connected between conductor 12 and $V_{EE}$. The gate of transistor M3 is connected by conductor 49 to the output of inverter 50. The source of transistor M3 is connected to $V_{EE}$ and its drain is connected to one terminal of resistor R2, the other terminal of which is connected to conductor 12. Transistor M3 and resistor R2 in FIG. 2 form the pull-down circuit, which can rapidly pull the output of the voltage regulator being monitored toward $V_{EE}$. This pull-down circuit is provided because a ramp-down operation takes very long amount of time if there is large output capacitor connected to $V_{SENSE}$ 12 (i.e., to the voltage regulator output).

Single-channel sequencer 10 is capable of determining when the supply voltage rail 12 has been powered up to a predetermined percentage, such as 90%, of its target voltage. Single-channel sequencer 10 also is capable of determining when the supply voltage rail 12 has been powered down to a predetermined percentage, such as 10%, of its target voltage. With this in mind, note that in FIG. 2 there are two basic signal paths, one path through high threshold comparator 11 to transistor M40 generate PG and the other path through low threshold comparator 7 to transistor M41 to generate PD.

Single-channel sequencer 10 establishes a high threshold level $V_{90\%}$ and a low threshold level $V_{10\%}$ for a voltage regulator output voltage $V_{OUT}$ being monitored by single-channel sequencer 10, the high threshold level $V_{90\%}$ being 90% of the target regulated voltage and the low threshold level $V_{10\%}$ being 10% of the target regulated voltage. Each comparator output drives logic circuitry that allows the PG, PD, EN_PG, and EN terminals of various single-channel sequencers 10 to be interconnected so as to provide various different combinations of power-up and power-down sequences of various regulated voltage rails.

Thus, for each of the above EN and EN_PG input signals and for each of the above PG and PD output signals, an "active" or "active-high" level is a high logic level, and an "inactive" or "inactive-low" level is a low logic level.

Open-drain output PG (Power Good) is an active-high signal which indicates that the supply voltage rail monitored by $V_{SENSE}$ conductor 12 is higher than $V_{90\%}$, i.e., higher than 90% of the target voltage of $V_{SENSE}$, and should be connected to enable a voltage regulator, such as a LDO or the like, the output of which is to be powered up next in a multiple-channel supply voltage sequencer constructed of multiple single-channel sequencers 10, as in subsequently described FIGS. 3A-5A and FIG. 8. (It should be appreciated that typically the PG terminal of the last single-channel sequencer 10 in a power-up chain of single-channel sequencers would be connected to a system controller, e.g., to a RESET input of a microprocessor or the like to inform it when the power-up procedure is finished.) Open-drain output PD (Power Down in Progress) is an active-high, inactive-low signal, which indicates that the supply voltage rail monitored on $V_{SENSE}$ power rail conductor 12 is higher than $V_{10\%}$, i.e., higher than 10% of its target voltage, and may be connected to a next single-channel supply voltage sequencer 10, for example as in subsequently described FIGS. 3A and 5A.

Input signal EN_PG (Enable PG) on conductor 35 is an active-high, inactive-low signal which overrides the PG signal regardless of the output of high threshold comparator 11.

Enable input signal EN on conductor 19 is an active-high signal which enables the normal operation of single-channel sequencer 10.

Any time a user or application circuit applies a low level to the EN_PG input of single-channel sequencer 10, it generates a low level on conductor 41 with no delay, causing a high level at the output 40 of inverter 2. That turns on transistor M40, resulting in an inactive-low level of Power Good signal PG.

If enable signal EN on conductor 19 is at a high level, then Power Down in Progress signal PD is high because EN overrides the output of comparator 7, as OR gate 30 acts as an AND gate for negative logic to disable or to inhibit an inactive-low level of PD until a low value of EN is applied to conductor 19. OR gate 30 then acts to propagate the output of comparator 7 to PD, and inverter 50 and AND gate 29 are provided for latching operation in the sequences indicated for subsequently described FIGS. 3B, 4B, 5B, and 8. Inverter 50 and AND gate 29 operate to keep the PG signal at a high level, as long as PG is high when the falling edge of EN occurs. If an application circuit (not shown) which includes single-channel sequencer 10 wants to "power down" a supply voltage rail controlled by the PG output of single-channel sequencer 10, that application circuit generates a low value of EN on conductor 19.

Single-channel sequencer 10 has open-drain output transistors M40 and M41, so when they are connected together (as in subsequently described FIG. 4A), that open-drain connection operates as a wired OR circuit. When the user application wants to cause a power-down sequence, for example as in subsequently described FIG. 4A, PG1 is not asserted, and only PD1 is asserted.

As previously mentioned, the circuitry including transistor M3 and resistor R2 in FIG. 2 is driven by the output 49 of inverter 50. The circuitry including transistor M3 is a pull-down circuit, with resistor R2 functioning as a current-limiting resistor. The output of inverter 50 is connected to the gate of AND gate 29, which causes the pulldown circuit M3, R2 to accelerate a power-down operation, especially if the user has connected a large amount of noise filter or bypass capacitance or the like to $V_{SENSE}$ conductor 12, as in FIGS. 3A-5A and 8. (This pull-down circuit M3,R3 is desirable in some cases, but it is not always needed.) Pull-up resistors R17 and R18 make it easier to implement the previously mentioned wired OR connection, since typically an entire user system uses open-drain transistor outputs, and having pull-up resistors R17 and R18 makes it easier to have other integrated circuits in that system communicate with sequencer 10. (However, this is not essential, and push-pull logic outputs could be used instead of open-drain outputs. Also, it should be understood that the logic level definitions for the input signals of comparators 7 and 11 can be established in various ways other than the way indicated in FIG. 2.)

FIGS. 3A, 4A, 5A, and 8 show examples of three-channel power sequencers each composed of three of the single-channel sequencers 10 shown in FIG. 2.

A "multi-channel" sequencer typically sends "enable" signals to enable various voltage regulators, respectively, in a predetermined or programmed order to establish a desired power-up sequence of the voltage regulators. The multi-channel sequencer then terminates the voltage regulator enable signals to "disable" the various voltage regulators, respectively, in either the same or a different programmed order, to establish a desired power-down sequence of the voltage regulators.

For example, in a power-up procedure a three-channel sequencer may send a first enable signal to a first LDO and wait for its output voltage to rise to 90% of its target voltage. After the output of the first LDO rises to 90% of its target voltage, the three-channel sequencer sends a second enable signal to a second LDO and waits for its output voltage to rise to 90% of its target voltage. After the output of the second LDO rises to 90% of its target voltage, the three-channel sequencer sends a third enable signal to a third LDO and waits for its output voltage to rise to 90% of its target voltage, which completes the power-up sequence.

Then, in a power-down procedure the three-channel sequencer may terminate the first enable signal, i.e., send a "disable" signal, to one of the three foregoing LDOs and wait for its output voltage to fall to 10% of its target voltage. After the output of that LDO falls below 10% of its target voltage, the three-channel sequencer sends a second "disable" signal to another of the three LDOs and waits for its output voltage to fall. After the output of that LDO falls below 10% of its target voltage, the three-channel sequencer sends a third "disable" signal to the remaining LDO and waits for its output voltage to fall below 10% of its target voltage, which completes the power-down sequence.

The connections to the various sequencers that establish the various power-up sequences in the subsequently described embodiments of the invention can be considered to be made in accordance with a "general power-up sequence rule". Also, the connections that establish the power-down sequences can be considered to be made in accordance with a "general power-down sequence rule". In each of the foregoing sequence rules, when it is indicated that a particular single-channel sequencer of a multi-channel sequencer is to be "powered up", what this means is that the voltage regulator (e.g., LDO #1, LDO #2, in FIGS. 3A, 4A, etc.) that applies the regulated voltage ($V_{OUT1}$, $V_{OUT2}$, etc.) to the $V_{SENSE}$ input of that particular single-channel sequencer is what is actually "powered up" or "powered down". It should be noted that a single-channel sequencer that is located at a particular point in the power-up sequence may be located at a different point in the corresponding power-down sequence.

In accordance with the above mentioned "general power-up sequence rule", the first regulator output voltage (e.g., $V_{OUT1}$, $V_{OUT2}$, or $V_{OUT3}$ in FIGS. 3A, 4A, 5A, and 8) to be powered up is applied to the $V_{SENSE}$ input of the first sequencer during a "power-up" sequence, the second regulator output voltage ($V_{OUT1}$, $V_{OUT2}$, or $V_{OUT3}$ etc.) to be powered up is applied to the $V_{SENSE}$ input of the second sequencer during the "power-up" sequence, and so forth for any additional sequencers which are to be included in the power-up sequence. Also in accordance with the "general power-up sequence rule", the PG output of the first sequencer in a power-up sequence is connected to the enable (EN) input of the voltage regulator supplying the regulated voltage to the second sequencer in the power-up sequence, the PG output of the second sequencer in the power-up sequence also is connected to the EN input of the voltage regulator supplying the regulated voltage to the third sequencer, and so forth for any additional sequencers which are to be included in the power-up sequence. (The PG output of the last sequencer of the power-up sequence may be connected to an enable input of a system which is being supplied by the power rails being powered up.)

Note that the foregoing "general power-up sequence rule" applies to all embodiments of the invention described herein.

In accordance with the above mentioned "general power-down sequence rule", an enable delay circuit (e.g., enable delay circuit 45 in subsequently described FIGS. 3A and 5A) is used as a kind of "$0^{th}$ sequencer" in the power-up sequence in the case wherein the first sequencer in the above described power-up sequence is not also the first sequencer in the power-down sequence. The EN_PG input of enable delay circuit 45 is considered to be an "equivalent EN_PG input", and the PG output of enable delay circuit 45 is considered to be an "equivalent PG output". (The term "EN_PG input" as used herein may refer to the EN_PG input of a sequencer or enable delay circuit 45, and the term "PG output" as used herein may refer to the PG output of either a sequencer or enable delay circuit 45.)

Further in accordance with the general power-down sequence rule, the PD output of the first sequencer in the power-down sequence is coupled to the EN_PG input of the sequencer (or enable delay circuit 45) the PG output of which drives an enable input of the voltage regulator (determined by the general power-up sequence rule) producing the supply voltage which is monitored by the second sequencer in the power-down sequence.

Also in accordance with the general power-down sequence rule, the PD output of the first sequencer in the power-down sequence is connected to the EN input of the second sequencer in the power-down sequence.

The PD output of the second sequencer in the power-down sequence is coupled to the EN_PG input of the sequencer (or enable delay circuit 45) the PG output of which drives an enable input of the voltage regulator producing the supply voltage which is monitored by the third sequencer in the power-down sequence.

The PD output of the second sequencer in the power-down sequence is also connected to the EN input of the third sequencer in the power-down sequence.

If there is a fourth sequencer, the PD output of the third sequencer in the power-down sequence is coupled to the EN_PG input of the sequencer the PG output of which drives an enable input of the voltage regulator producing the supply voltage which is monitored by the fourth sequencer in the power-down sequence, and so forth for any additional sequencers which are included in the power-down sequence. That is, the PD output of the third sequencer in the power-down sequence is also connected to the EN input of the fourth sequencer in the power-down sequence.

The foregoing pattern is repeated for any additional sequencers which are in the power-down sequence.

The PD output of the last sequencer in the power-down sequence may be unused. Then, based on the general power-down sequence rule, the connection of the EN_PG input of the last sequencer in the power-up sequence is unimportant, and may be connected to EN_EXT.

To complete a sequencing system, the foregoing "general power-up sequence rule" and "general power-down sequence rule" needs to be supplemented by a "general miscellaneous sequencing rule". In accordance with this "general miscellaneous sequencing rule", there are two conditional cases that depend on whether or not the first sequencer in the power-down sequence is also the first sequencer in the power-up sequence.

First, if the first sequencer in the power-up sequence is not the first one in the power-down sequence, then the external enable signal EN_EXT (shown in subsequently described FIGS. 3A, 4A, 5A and 8) is connected to the SET input of the above mentioned enable delay circuit (e.g., enable delay circuit 45, the PG output of which is connected to the enable input of the first voltage regulator in the power-up sequence). Also, EN_EXT is connected to the EN_PG input of the sequencer the PG output of which drives the enable input of the voltage regulator producing the supply voltage which is monitored by the first sequencer in the power-down sequence, and EN_EXT also is connected to the EN input of the first sequencer in the power-down sequence.

Second, if the first sequencer in the power-up sequence is also the first one in the power-down sequence, then EN_EXT is connected to the enable input of the first voltage regulator in both the power-up sequence and the power-down sequence and is connected to the EN input of the first sequencer in the power-down sequence. (In this case, the subsequently described enable delay circuit 46 is not needed.)

Note that the foregoing general power-down sequence rule and the foregoing general miscellaneous sequencing rule apply to the multi-channel sequencers of subsequently described FIGS. 3A, 5A and 8, but does not apply to the multi-channel sequencer 100-2 shown in subsequently described FIG. 4A.

Figure 3A:
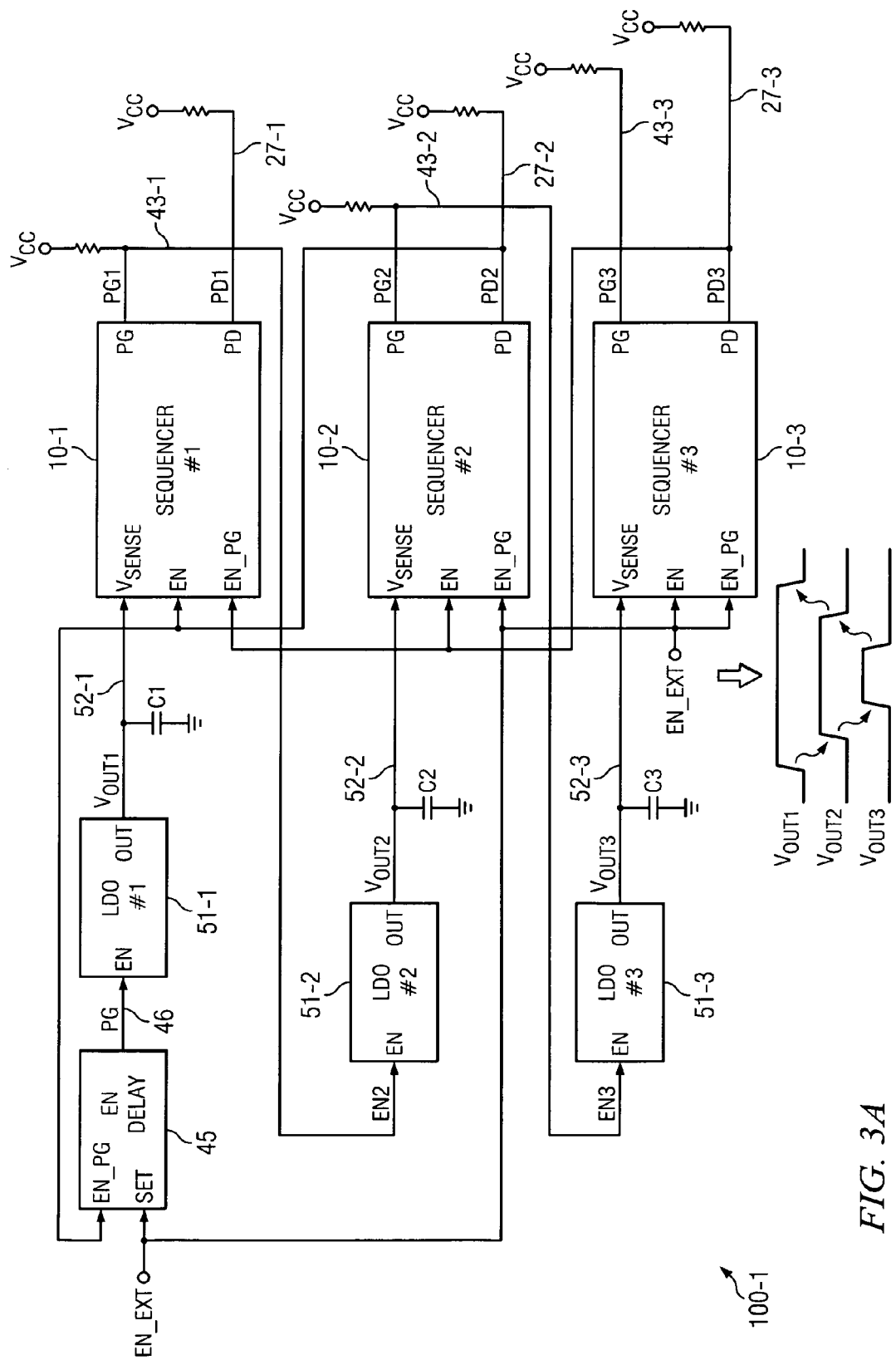
FIG. 3A is a block diagram of a first three-channel supply voltage sequencer including three of the interconnected single-channel supply voltage sequencers of FIG. 2.

FIG. 3A shows a three-channel sequencer 100-1 that includes a first sequencer 10-1 labeled sequencer #1, a second sequencer 10-2 labeled sequencer #2, and a third sequencer 10-3 labeled sequencer #3, each of which may be the same as sequencer 10 shown in FIG. 2. Three-channel sequencer 100-1 provides a power-up/power-down sequence that is illustrated by the simplified representations of the $V_{OUT1}$, $V_{OUT2}$, and $V_{OUT3}$ waveforms shown in FIG. 3A. The power-up sequence of $V_{OUT1}$, $V_{OUT2}$, and $V_{OUT3}$ occurs in that order, and the power-down sequence occurs in the order $V_{OUT3}$, $V_{OUT2}$, $V_{OUT1}$. Other power-up/power-down sequences also are subsequently described, corresponding to the simplified waveforms shown FIGS. 4A, 5A, and 8, respectively. The PG and PD outputs of sequencer #1 are referred to as PG1 and PD1, respectively. Similarly, the signals produced by the PG and PD outputs of sequencer #2 are referred to as PG2 and PD2, respectively, and the signals produced by the PG and PD outputs of sequencer #3 are referred to as PG3 and PD3, respectively.

The $V_{SENSE}$ input of sequencer #1 is connected by conductor 52-1 to receive the regulated output voltage $V_{OUT1}$, generated on the $V_{OUT}$ terminal of a first voltage regulator 51-1 labeled LDO #1. A relatively large capacitance C1 is coupled between $V_{OUT1}$ and ground or $V_{EE}$. Power Good output PG output PG1 of sequencer #1 is connected to conductor 43-1, which is also coupled by a pull-up resistor to $V_{CC}$. The PD output of sequencer #1 is connected to conductor 27-1, which is coupled to $V_{CC}$ by another pull-up resistor. PG1 also is connected by conductor 43-1 to provide the enable signal EN2 to the enable input EN of LDO #2.

Enable EN input of LDO #1 is connected by conductor 46 to the PG output of enable delay circuit 45, details of which are shown in subsequently described FIG. 6. A SET input of enable delay circuit 45 is connected to receive external enable signal EN_EXT. Note that enable delay circuit 45 may have the structure shown in FIG. 6, and may be integrated into sequencer #2 in the manner indicated in FIG. 7.

The $V_{SENSE}$ input of sequencer #2 is connected by conductor 52-2 to receive the regulated output voltage $V_{OUT2}$ generated on the $V_{OUT}$ terminal of a second voltage regulator 51-2 labeled LDO #2. A relatively large capacitance C2 is coupled between $V_{OUT2}$ and ground or $V_{EE}$. The PG output PG2 of sequencer #2 is connected to conductor 43-2, which also is coupled by a pull-up resistor to $V_{CC}$. PG2 also is connected by conductor 43-2 to provide the enable signal EN3 to the enable input EN of LDO #3. The PD output PD2 of sequencer #2 is connected to conductor 27-2, which is coupled to $V_{CC}$ by another pull-up resistor. The PD2 output of sequencer #2 also is connected by conductor 27-2 to the EN_PG input of enable delay circuit 45 and to the EN input of sequencer #1.

Similarly, the $V_{SENSE}$ input of sequencer #3 is connected by conductor 52-3 to receive the regulated output voltage $V_{OUT3}$ generated on the $V_{OUT}$ terminal of a third voltage regulator 51-3 labeled LDO #3. A relatively large capacitance C3 is coupled between $V_{OUT3}$ and ground or $V_{EE}$. The PG3 output of sequencer #3 is generated on conductor 43-3, which is connected by a pull-up resistor to $V_{CC}$. The PD3 output of sequencer #3 is connected to conductor 27-3, which is coupled to $V_{CC}$ by another pull-up resistor. Conductor 27-3 also is connected to the EN input of sequencer #2 and the EN_PG input of sequencer #1. The EN input of sequencer #3 is connected to receive the external enable signal EN_EXT. The EN_PG input of sequencer #2 is connected to receive the external enable signal EN_EXT. Also, the EN_PG input of sequencer #3 may be connected to EN_EXT.

Figure 3B:
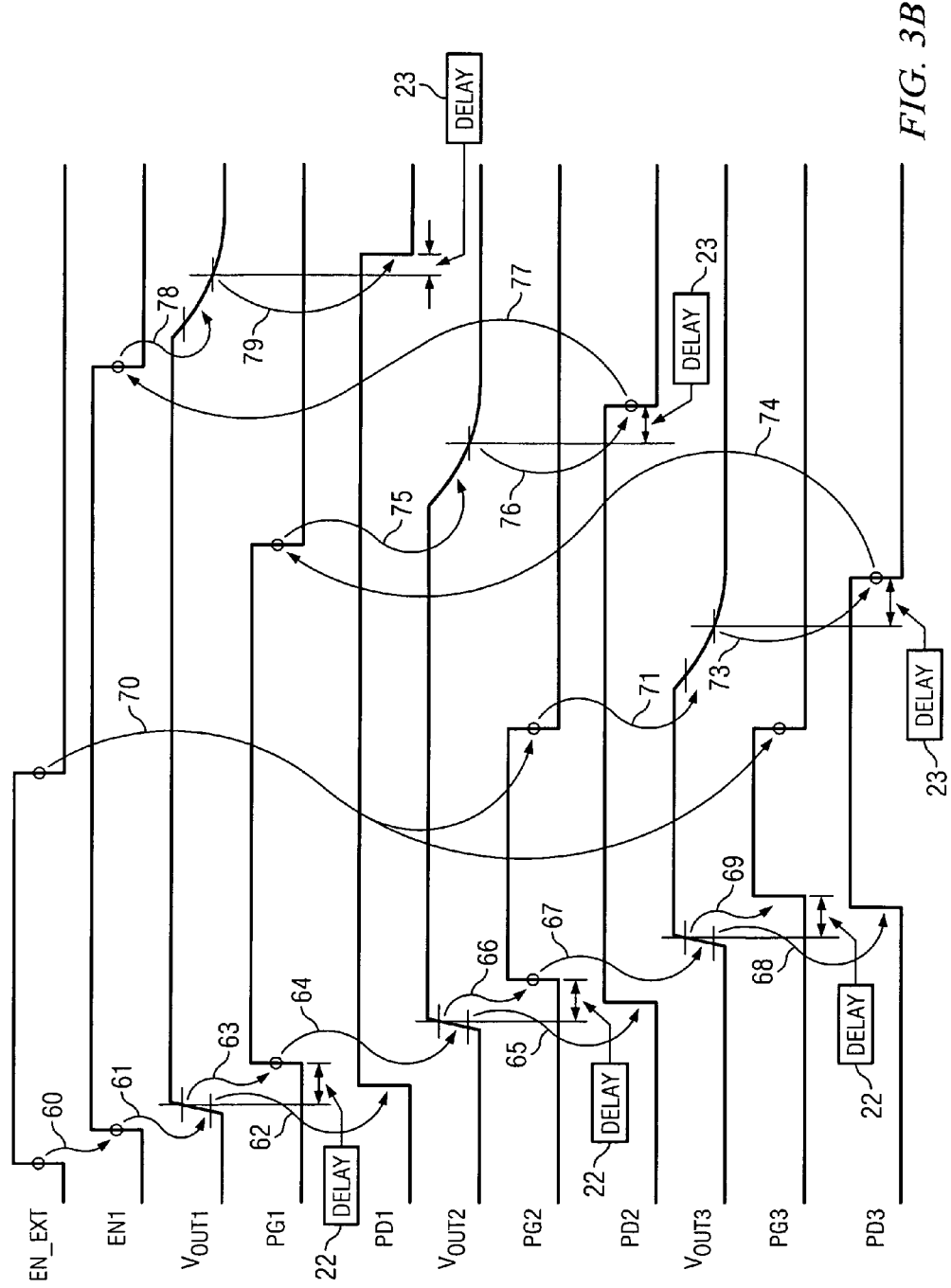
FIG. 3B is a timing diagram illustrating the operation of the three-channel supply voltage sequencer of FIG. 3A.

FIG. 3B shows waveforms for a power-up/power-down sequence of three-channel supply voltage sequencer 100-1 of FIG. 3A, which is configured for the above described sequencing defined by the $V_{OUT1}$, $V_{OUT2}$, and $V_{OUT3}$ waveforms shown in FIG. 3A.

In FIG. 3B, the rising edge of EN_EXT causes the rising edge of EN1 to occur, as indicated by arrow 60, and this enables or activates LDO #1. That causes the rising edge of $V_{OUT1}$ to occur, as indicated by arrow 61. When the rising edge of $V_{OUT1}$ exceeds its 10% threshold voltage $V_{10\%}$ (as indicated by the lower horizontal slash mark on the rising edge of $V_{OUT1}$), that causes low threshold comparator 7 (FIG. 2) of sequencer #1 in FIG. 3A to cause PD1 to go high, as indicated by arrow 62. ($V_{OUT1}$ exceeds the value of V2 divided down by resistors R4 and R3, causing the output of comparator 7 to go high, and that high-level passes through OR gate 30 and delay circuit 23, and then is inverted by inverter 4, turning off transistor M41 and allowing an external pull-up device to generate the rising edge of PD1.) When $V_{OUT1}$ exceeds its 90% threshold voltage $V_{90\%}$ (as indicated by the upper horizontal slash mark on the rising edge of $V_{OUT1}$), that causes comparator 11 (FIG. 2) of sequencer #1 to cause PG1 to go high, as indicated by arrow 63, after the occurrence of a suitable delay determined by rising-only-edge delay circuit 22 (FIG. 2) of sequencer #1. (The value of $V_{OUT1}$, scaled down by resistors R1 and R0, exceeds the value of reference voltage V2 at the (−) input of comparator 11. The high output of comparator 11 passes through OR gate 39 and AND gate 24 and delay circuit 22 and is inverted by inverter 2, thereby turning off transistor M40, and an external pull-up device causes the rising edge of PG1).

The rising edge of PG1 then enables LDO #2, and, as indicated by arrow 64, causes $V_{OUT2}$ to begin to rise. When $V_{OUT2}$ reaches it its $V_{10\%}$ threshold level, comparator 7 of sequencer #2 causes the rising edge of PD2, as indicated by arrow 65. When $V_{OUT2}$ reaches its $V_{90\%}$ threshold level, comparator 11 of sequencer #2 causes transistor M40 of sequencer #2 to be turned off, whereby an external pull-up device (not shown) generates the rising edge of PG2, as indicated by arrow 66, after a delay caused by rising-only-edge delay circuit 22 of sequencer #2.

The rising edge of PG2 then enables LDO #3, and, as indicated by arrow 67, $V_{OUT3}$ begins to rise. When $V_{OUT3}$ reaches its $V_{10\%}$ level, comparator 7 of sequencer #3 causes the rising edge of PD3, as indicated by arrow 68. When $V_{OUT3}$ reaches its $V_{90\%}$ level, high threshold comparator 11 of sequencer #3 causes transistor M40 thereof to be turned off, thereby generating the rising edge of PG3, as indicated by arrow 69, after a delay caused by rising-only-edge delay circuit 22 of sequencer #3. This completes the $V_{OUT1}$, $V_{OUT2}$, $V_{OUT3}$ power-up sequence for the three-sequencer circuit 100-1 shown in FIG. 3A.

In the power-down sequence illustrated by the waveforms in FIG. 3B, the falling edge of EN_EXT is coupled currently to the "Enable PG" input EN_PG of sequencer #2, and as indicated by arrow 70, this immediately causes a falling edge of PG2 to produce its inactive-low level. This is because EN-EXT going low causes the output of AND gate 24 in sequencer #2 to go low, causing the output of inverter 2 to go high, turning on transistor M40, and thereby generating the falling edge of PG2. The falling edge of PG2 is coupled directly to the enable input of LDO #3 in FIG. 3A, causing it to disable regulator LDO #3. That causes the falling edge of PG3 to occur, as also indicated by arrow 70. As indicated by arrow 71, this initiates the falling edge of $V_{OUT3}$.

Note that because the EN_PG input and the EN input of sequencer #3 are connected directly to EN_EXT, the previously mentioned pull-down circuit (including transistor M3 and resistor R2 (FIG. 2)) in sequencer #3 operates to accelerate the ramping down of $V_{OUT3}$.) When $V_{OUT3}$ decreases a bit to its $V_{90\%}$ level, that causes the output of high threshold comparator 11 in sequencer #3 to go low, resulting in low levels at the outputs of OR gate 39 and AND gate 24, and consequently resulting in a high level at the output of inverter 2 which turns transistor M40 on. As indicated by arrow 73, when $V_{OUT3}$ has fallen all the way to its $V_{10\%}$ level, low threshold comparator 7 changes state and, after a delay caused by delay circuit 23, causes the falling edge of PD3 to occur.

Note that the PD3 output of sequencer #3 is connected directly to the EN_PG input of sequencer #1. This causes the PG1 output of sequencer #1 to fall, as indicated by arrow 74. That disables LDO #2, thereby causing $V_{OUT2}$ to fall as indicated by arrow 75.

As previously mentioned, typically there is a processor or the like (not shown) that needs to begin overall system operation once the entire power-up sequence(s) is complete. That processor typically would receive the PG output PG3 from sequencer #3 in the example of FIG. 3A in order to inform the processor when a power-down sequence has been initiated. That is one reason EN_EXT is connected to the EN_PG input of sequencer #3.

When $V_{OUT2}$ in FIG. 3B has fallen all the way to its $V_{10\%}$ level, low threshold comparator 7 of sequencer #2 causes transistor M41 to turn on after a delay caused by delay circuit 23. This causes the falling edge of PD2 to occur, as indicated by arrow 76.

Since PD2 is connected to the EN_PG input of enable delay circuit 45, the falling edge of PD2 causes the falling edge of EN1 (FIG. 3A) to occur, as indicated by arrow 77 in FIG. 3B. The falling edge of EN1 then disables regulator LDO #1, thereby causing the falling edge of $V_{OUT1}$ to occur, as indicated by arrow 78. When $V_{OUT1}$ reaches its $V_{10\%}$ level, low threshold comparator 7 of sequencer #1 causes transistor M41 thereof to turn on after a delay caused by delay circuit 23, thereby causing the trailing edge of PD1 to occur as indicated by arrow 79. That completes the $V_{OUT3}$, $V_{OUT2}$, $V_{OUT1}$ power-down sequence for the system shown in FIG. 3A.

Note that LDO #1 needs to remain enabled at the end of a power-down sequence, and that is accomplished by means of enable delay circuit 45. LDO #2 needs to be enabled until LDO #3 is turned off in the power-down sequence, and that also is accomplished by means of enable delay circuit 45, to keep LDO #1 active at the last stage of the power-down sequence.

Figure 4A:
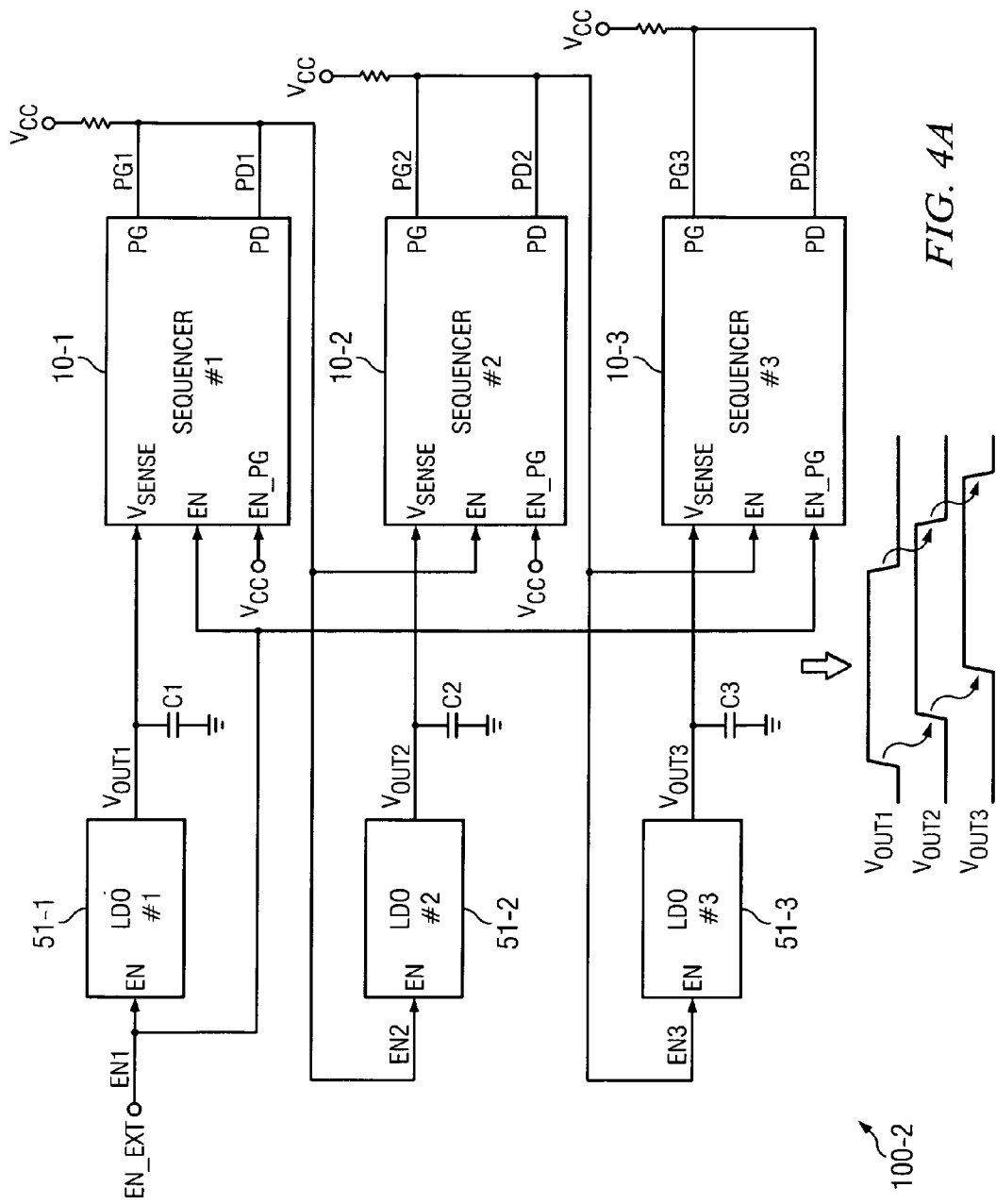
FIG. 4A is a block diagram of a second three-channel supply voltage sequencer including three of the interconnected single-channel supply voltage sequencers of FIG. 2.

FIG. 4A shows a three-channel sequencer 100-2 which provides the power-up/power-down sequence that is illustrated by the simplified $V_{OUT1}$, $V_{OUT2}$, and $V_{OUT3}$ waveforms shown in FIG. 4A. The power-up sequence of $V_{OUT1}$, $V_{OUT2}$, and $V_{OUT3}$ occurs in that order, and later a power-down sequence occurs in the same order $V_{OUT1}$, $V_{OUT2}$, $V_{OUT3}$ as the power-up sequence.

Similarly to sequencer 100-1 of FIG. 3A, sequencer 100-2 of FIG. 4A includes first sequencer 10-1 labeled sequencer #1, a second sequencer 10-2 labeled sequencer #2, and a third sequencer 10-3 labeled sequencer #3, each of which may be the same as sequencer 10 shown in FIG. 2. In three-channel sequencer 100-2, the EN input of LDO #1 receives the external enable signal EN_EXT, which is also applied to the EN input of sequencer #1 and to the EN_PG input of sequencer #3. The output $V_{OUT1}$ of LDO #1 is connected to the $V_{SENSE}$ input of sequencer #1. The EN_PG input of sequencer #1 is connected to $V_{CC}$. The PG and PD outputs of sequencer #1 are wire ORed and connected to the EN input of LDO #2 and the EN input of sequencer #2, and also are coupled to $V_{CC}$ by a resistor. Similarly, the PG and PD outputs of sequencer #2 are wire ORed and connected to the EN input of LDO #3 and the EN input of sequencer #3, and also are coupled to $V_{CC}$ by a resistor. The PG and PD outputs of sequencer #3 are wire ORed and coupled to $V_{CC}$ by a resistor.

Figure 4B:
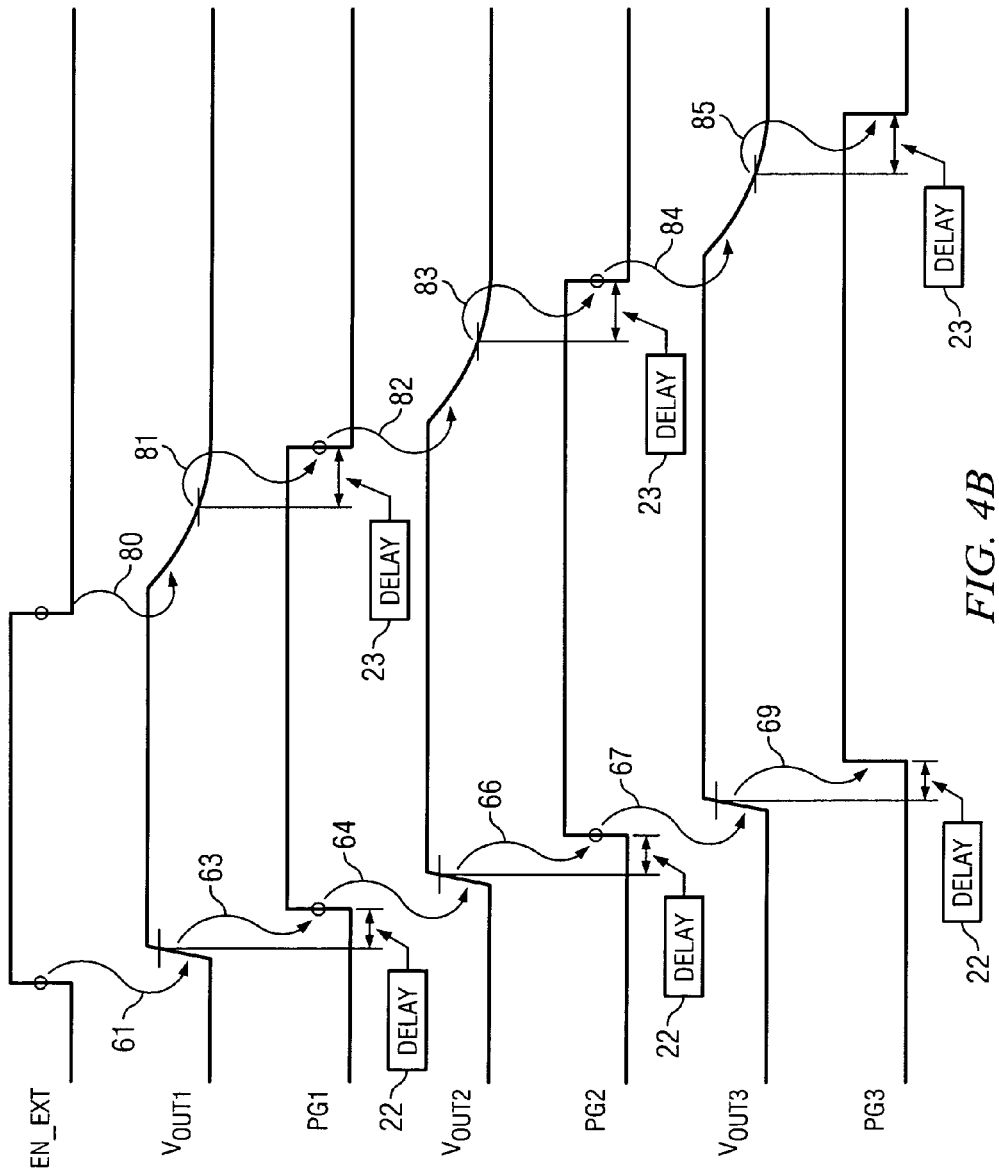
FIG. 4B is a timing diagram illustrating the operation of the three-channel supply voltage sequencer of FIG. 4A.

Referring to FIG. 4B, the power-down sequence $V_{OUT1}$, $V_{OUT2}$, $V_{OUT3}$ for three-channel sequencer 100-2 in FIG. 4B is essentially the same as the previously described power-down sequence for sequencer 100-1 of FIG. 3A, although in FIG. 4B the steps indicated by arrows 62, 65, and 68 in FIG. 3B are omitted. This is because in FIG. 4A, the various PG and PD outputs are wire ORed together. However, the power-down sequence $V_{OUT1}$, $V_{OUT2}$, $V_{OUT3}$ for three-channel sequencer 100-2 in FIG. 4A is substantially different than for sequencer 100-1 in FIG. 3A.

Still referring to FIG. 4B, during the power-down sequence the falling edge of EN_EXT disables regulator LDO #1 and therefore causes the falling edge of $V_{OUT1}$ to occur as indicated by arrow 80, and also sets sequencer #1 to its power-down mode. Sequencer #1 does not monitor the $V_{90\%}$ level of $V_{OUT1}$ in its power-down state, and only monitors the $V_{10\%}$ level of $V_{OUT1}$. When $V_{OUT1}$ falls to its $V_{10\%}$ level, that causes the falling edge of PD1 of sequencer #1 to occur after a delay caused by falling-edge-only delay circuit 23 (FIG. 2) thereof, as indicated by arrow 81.

The falling edge of PG1 disables regulator LDO #2 and therefore causes the falling edge of $V_{OUT2}$ to occur, as indicated by arrow 82. When $V_{OUT2}$ falls to its $V_{10\%}$ level, that causes the falling edge of PG2 of sequencer #2 to occur after a delay caused by falling-edge-only delay circuit 23 (FIG. 2) thereof, as indicated by arrow 83. Similarly, the falling edge of PG2 disables regulator LDO #3 and therefore causes the falling edge of $V_{OUT3}$ to occur as indicated by arrow 84. When $V_{OUT3}$ falls to its $V_{10\%}$ level, that causes the falling edge of PG3 of sequencer #3 to occur after a delay caused by delay circuit 23, as indicated by arrow 85. This completes the power-down sequence $V_{OUT1}$, $V_{OUT2}$, $V_{OUT3}$ for sequencer 100-2 of FIG. 4A. Note that sequencer 100-2 (described with reference to FIGS. 4A and 4B) represents an exception to the above mentioned general power-down sequencing rule and general miscellaneous sequencing rule for the case wherein the first sequencer in the power-up sequence is also the first sequencer in the power-down sequence. Also note that subsequently described FIG. 8 shows a different sequencer for the case in which the first sequencer in the power-up sequence is also the first sequencer in the power-down sequence, constructed in accordance with the previously mentioned general power-down sequencing rule and general miscellaneous sequencing rule.

Figure 5A:
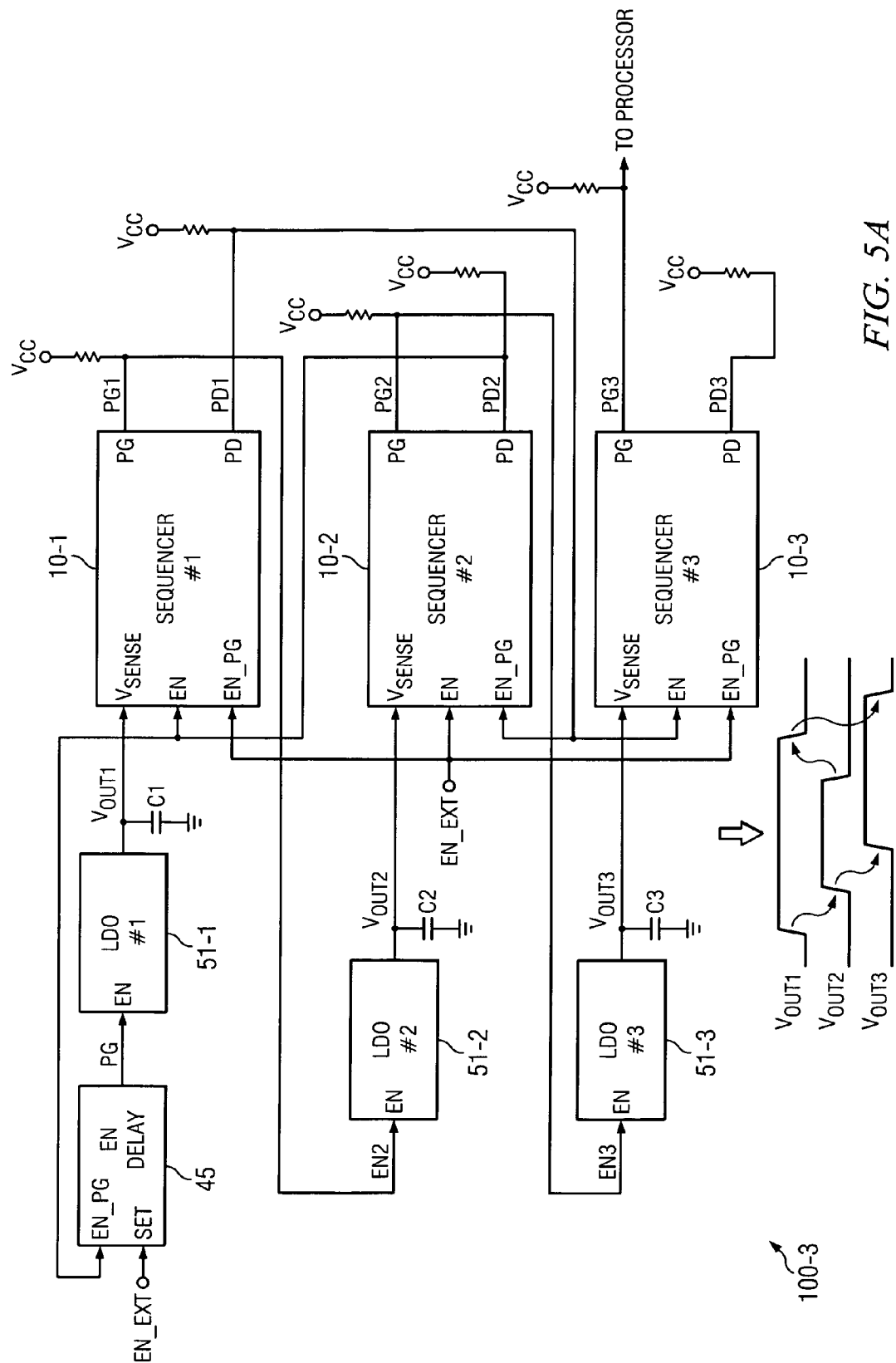
FIG. 5A is a block diagram of a third three-channel supply voltage sequencer including three of the interconnected single-channel supply voltage sequencers of FIG. 2.

FIG. 5A shows a three-channel sequencer 100-3 which provides the power-up/power-down sequence illustrated by the simplified representations of the $V_{OUT1}$, $V_{OUT2}$, and $V_{OUT3}$ waveforms shown in FIG. 5A. Specifically, for sequencer 100-3 in FIG. 5A, the power-up sequence of $V_{OUT1}$, $V_{OUT2}$, $V_{OUT3}$ occurs in that order, and the power-down sequence occurs in the order $V_{OUT2}$, $V_{OUT1}$, and $V_{OUT3}$. (Typically, PG3 in FIGS. 3A, 4A, and 5A is coupled to notify a microprocessor or controller that the power-down sequence is complete.)

Similarly to sequencer 100-1 of FIG. 3A, sequencer 100-3 of FIG. 5A includes a first sequencer 10-1 labeled sequencer #1, a second sequencer 10-2 labeled sequencer #2, and a third sequencer 10-3 labeled sequencer #3, each of which may be the same as sequencer 10 in FIG. 2. LDO #1 is coupled to sequencer #1 and to enable delay circuit 45 in the same manner as in FIG. 3A. LDO #2 is coupled to sequencer #2 and also to sequencer #1 in the same manner as in FIG. 3A, and LDO #3 is coupled to sequencer #3 and also to sequencer #2 in the same manner as in FIG. 3A. The external enable signal EN_EXT is connected to the EN_PG input of sequencer #1, the EN input of sequencer #2 in three-channel sequencer 100-3, and also to the EN_PG input of sequencer #3 in FIG. 3A. Also, the output signal PD1 generated by sequencer #1 in FIG. 5A is connected to the EN_PG input of sequencer #2 and the EN input of sequencer #3.

Figure 5B:
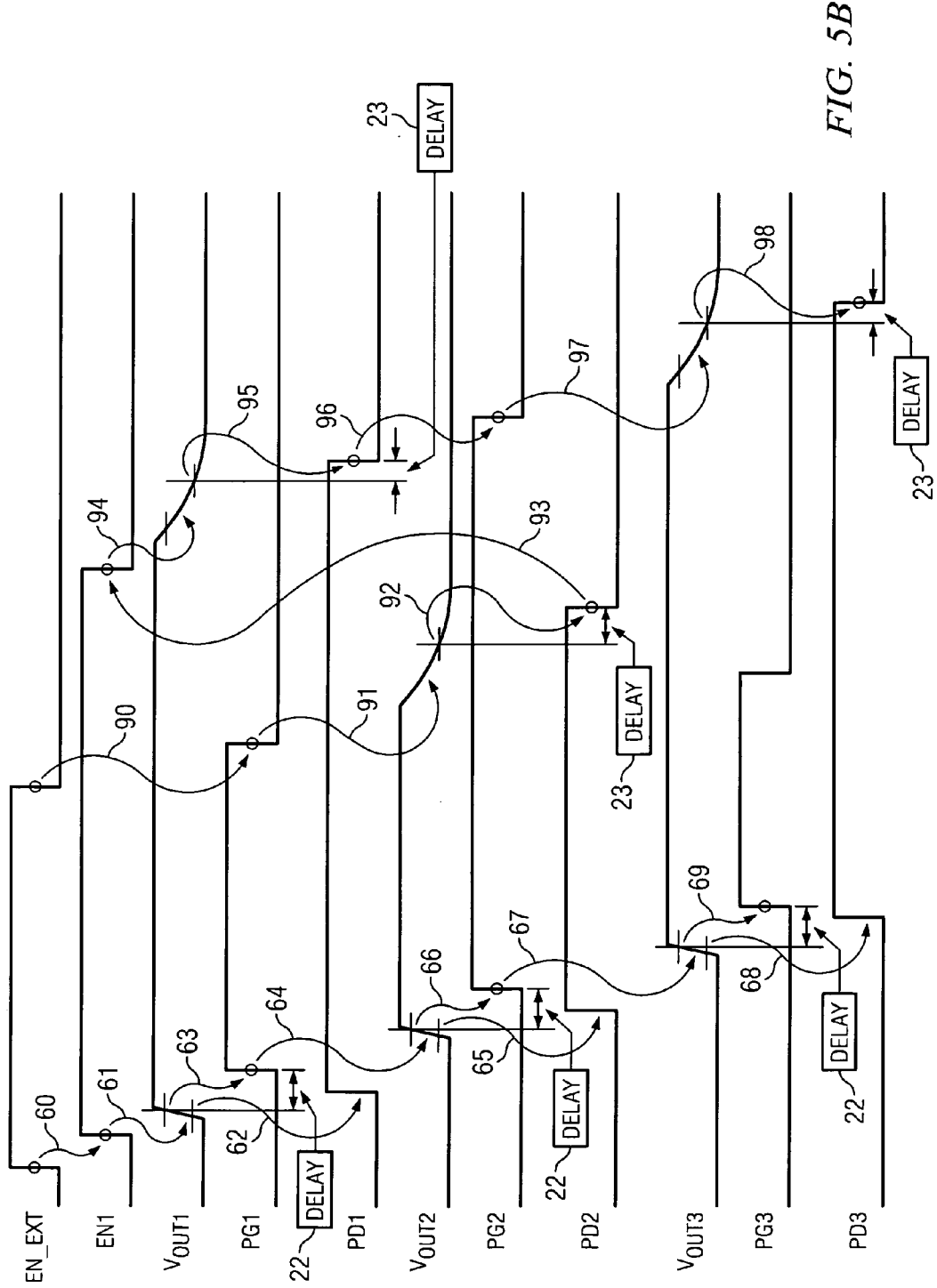
FIG. 5B is a timing diagram illustrating the operation of the three-channel supply voltage sequencer of FIG. 5A.

Referring to FIG. 5B, the power-down sequence $V_{OUT1}$, $V_{OUT2}$, $V_{OUT3}$ for the three-channel sequencer 100-3 is essentially the same as the previously described power-down sequence for the sequencer 100-1 of FIG. 3A. However, the power-down sequence $V_{OUT2}$, $V_{OUT1}$, $V_{OUT3}$ for three-channel sequencer 100-3 of FIG. 5A is substantially different than for sequencer 100-1 of FIG. 3A.

Specifically, to begin the power-down sequence of $V_{OUT2}$, $V_{OUT1}$, $V_{OUT3}$ for three-channel sequencer 100-3, the falling edge of EN_EXT is coupled directly to the EN_PG inputs of sequencers #1 and #3 and also to the EN input of sequencer #2. Enable delay circuit 45 operates to maintain certain conditions during this power-down sequence. Sequencer #1 receives EN_EXT on its EN_PG input, sequencer #2 receives EN_EXT on its EN input, and sequencer #3 receives EN_EXT on its EN_PG input. At the end of the power-up sequence, PG3 of sequencer #3 may be coupled to an external processor or the like (not shown) to notify the processor when the power-up sequence is complete so that it is safe to resume operation of a user system powered by $V_{OUT1}$, $V_{OUT2}$, and $V_{OUT3}$.

For the power-down sequence, the first step is to turn LDO #2 off. That means it is necessary to send a low value of EN_EXT to the EN_PG input of sequencer #1 to cause it to produce a low value of PG1. That disables LDO #2, causing $V_{OUT2}$ to ramp down. Sequencer #2 receives EN_EXT at its EN input and goes into its power-down mode before $V_{OUT2}$ falls below its $V_{10\%}$ level, and thereby causes the trailing edge of PD2 to occur and be fed back to both the EN_PG input of enable delay circuit 45 and the EN input of sequencer #1. The trailing edge of PD2 therefore sets sequencer #1 into its power-down mode and also causes enable delay circuit 45 to disable LDO #1. The disabling of LDO #1 causes $V_{OUT1}$ to ramp down. Sequencer #1 monitors the $V_{10\%}$ level of $V_{OUT1}$, and produces the falling edge of PD1 when $V_{OUT1}$ falls to its $V_{10\%}$ level. That causes PG2 to disable LDO #3. The trailing edge of PD1 applied to the EN_PG input of sequencer #2 causes the trailing edge of PG2 to occur so that LDO #3 is disabled. This causes $V_{OUT3}$ to ramp down. The falling edge of PD1 on the EN input of sequencer #3 causes it to go into its power-down mode while $V_{OUT3}$ is ramping down. When $V_{OUT3}$ falls below its $V_{10\%}$ level, that causes the falling edge of PD3 to occur, which completes the explanation of the power-down sequence.

The foregoing power-down operation of three-channel sequencer 100-3 is illustrated in FIG. 5B, wherein the trailing edge of EN_EXT applied to the EN_PG input of sequencer #1 immediately causes a negative edge of PG1 to occur, as indicated by arrow 90. This disables regulator LDO #2, which in turn causes $V_{OUT2}$ to begin ramping down, as indicated by arrow 91. Then, when $V_{OUT2}$ reaches its $V_{10\%}$ level, that causes the falling edge of PD2 to occur, as indicated by arrow 92.

The falling edge of PD2 causes enable delay circuit 45 to generate the falling edge of EN1, as indicated by arrow 93. The falling edge of EN1 disables regulator LDO #1 and thereby causes the down-ramping edge of $V_{OUT1}$ to occur, as indicated by arrow 94. When the $V_{10\%}$ level of $V_{OUT1}$ is reached, low threshold comparator 7 causes the falling edge of PD1 to occur after a delay caused by falling-edge-only delay circuit 23 (FIG. 2), as indicated by arrow 95, and as previously described with reference to FIG. 3A. The falling edge of PD 1 applied to the EN_PG input of sequencer #2 causes the falling edge of PG2 to occur, as indicated by arrow 96. The falling edge of PG2 disables regulator LDO #3, thereby causing the falling edge of $V_{OUT3}$ to occur as indicated by arrow 97. When the falling edge of $V_{OUT3}$ reaches its $V_{10\%}$ level, that causes low threshold comparator 11 to turn off transistor M40 after the delay caused by delay circuit 22. That causes the falling edge of PD3 to occur, as indicated by arrow 98. That completes the power-down sequence $V_{OUT2}$, $V_{OUT1}$, $V_{OUT3}$ in three-channel sequencer 100-3 shown in FIG. 5A.

PG of the last sequencer in the power-up sequence (PG3 in the foregoing examples) is not important and may be connected to a system enable input or to an input of a processor. However, it typically is better to have EN_PG of that last sequencer in the power-up-sequence connected to EN_EXT.

Note that if EN a single-channel 10 of FIG. 2 is at a high level, i.e., during normal operation, PD is high, and OR gate 30 "masks" or "disables" PD until a low value of EN is applied. If an application circuit (not shown) wants to power-down $V_{SENSE}$, it generates a low value of EN, and OR gate 30 acts as a buffer (i.e., as an AND gate for negative logic). Inverter 50 and AND gate 29 in multi-channel sequencer 100-2 of FIG. 4A and multi-channel sequencer 100-3 of FIG. 5A operate to keep the PG signal active while EN is low.

Figure 8:
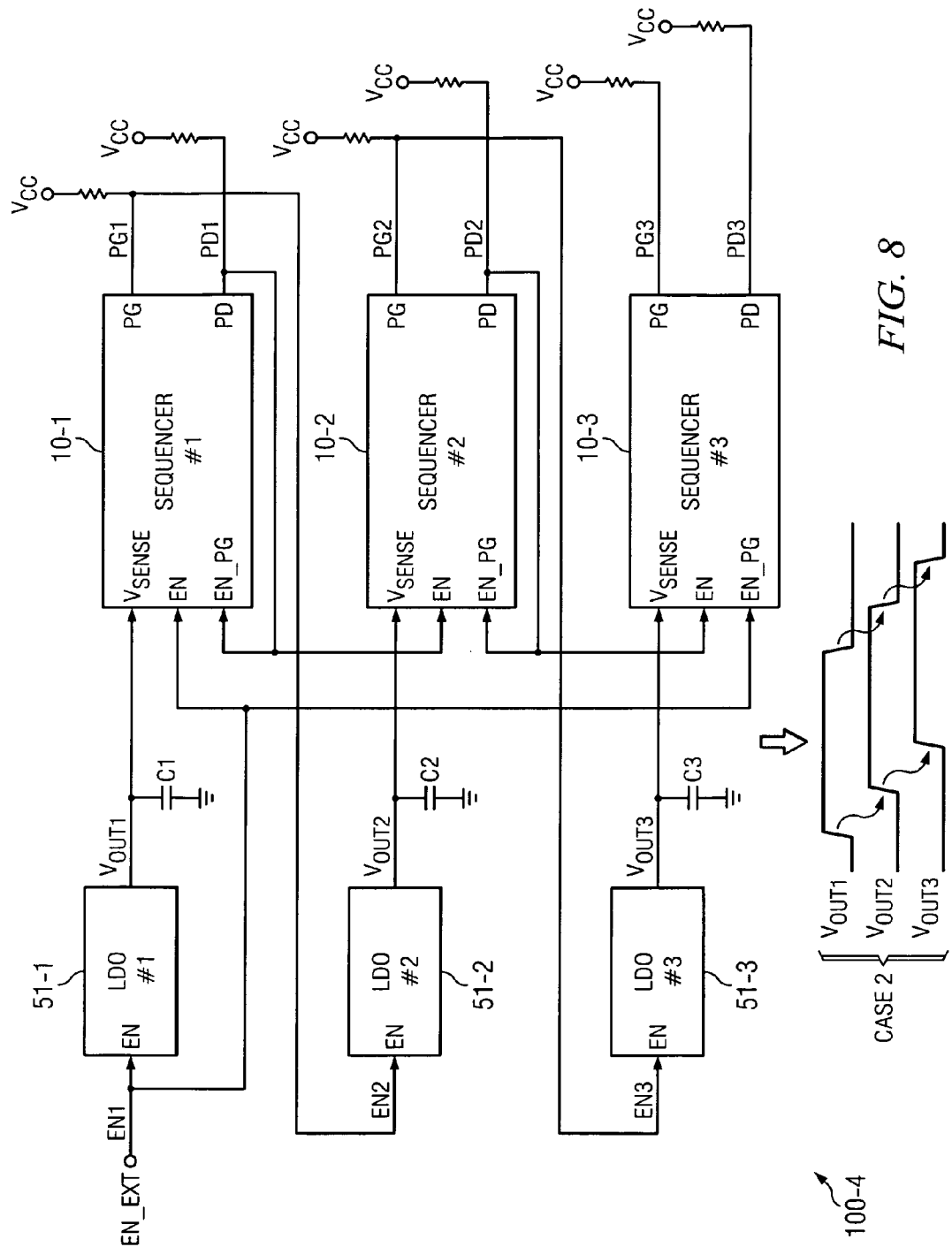
FIG. 8 is a block diagram of a fourth three-channel supply voltage sequencer including three of the interconnected single-channel supply voltage sequencers of FIG. 2.

The connections shown in three-channel sequencers 100-1, 100-3, and 100-4 in FIGS. 3A, 5A, and 8, respectively, are examples of a general approach of providing supply voltage sequencers that generate different, somewhat "random" power-up and power-down sequences which are not limited to the three-channel sequencers shown. More complex power-up and power-down sequencing can be accomplished by increasing the number of supply voltage rails or channels, i.e., supply voltage regulators. Suitable connections between the various three-channel supply voltage sequencers can be made so as to provide other various desired sequences of powering down the multiple supply voltage rails or channels.

Figure 6:
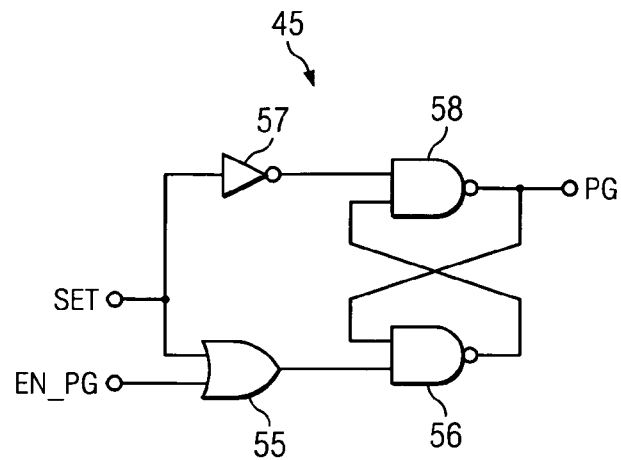
FIG. 6 is a diagram of enable delay circuit 45 in FIGS. 3A and 5A.

FIG. 6 shows an implementation of previously mentioned enable delay circuit 45, which includes two cross-coupled NAND gates 56 and 58, an OR gate 55, and an inverter 57. One input of NAND gate 58 is connected to the output of inverter 57. One input of NAND gate 56 is connected to the output of OR gate 55. The other input of NAND gate 56 is connected to the output of NAND gate 58, on which the signal PG is generated. The first input of enable delay circuit 45 is labeled SET and is connected to one input of OR gate 55 and to the input of inverter 57. The second input of enable delay circuit 45 is an active-low logic input signal labeled EN_PG and is connected to the other input of OR gate 55. Cross-coupled NAND gates 56 and 58 form a basic latch circuit which, in the examples of FIGS. 3A and 5A, is set in response to a high level of EN_EXT applied to the SET input of enable delay circuit 45. The basic latch circuit is reset in response to a low level of both EN_EXT on the SET input and a low level of the PD output of one of the single-channel sequencers 10 in a multi-channel sequencer applied to the EN_PG input of enable delay circuit 45.

Figure 7:
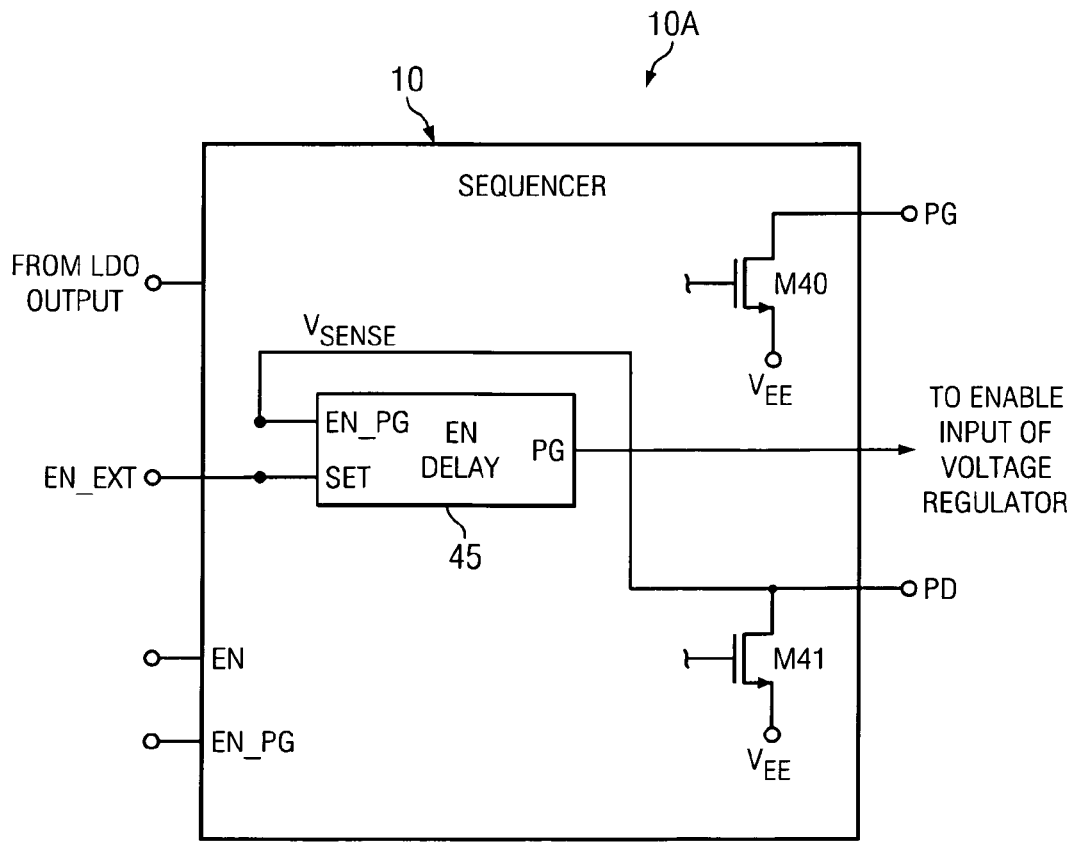
FIG. 7 is a block diagram illustrating how the enable delay circuit 45 of FIG. 6 can be integrated in integrated circuit chip with the single-channel supply voltage sequencer of FIG. 2.

FIG. 7 illustrates how enable delay circuit 45 of FIG. 6 can be integrated into the same integrated circuit chip as single-channel sequencer 10 of FIG. 2. The enable delay circuit 45 shown in FIG. 6 is simply included with single-channel sequencer 10, with an additional output terminal by means of which the PG output of enable delay circuit 45 is applied to an LDO enable signal. The external signal EN_EXT is coupled to the SET input of enable delay circuit 45. The EN_PG input of enable delay circuit 45 is internally connected to the PD output of single-channel sequencer 10, as shown.

FIG. 8 shows another three-channel sequencer 100-4 which provides the power-up/power-down sequence that is illustrated by the simplified $V_{OUT1}$, $V_{OUT2}$, and $V_{OUT3}$ waveforms shown therein. As in FIG. 4A, power-up sequence of $V_{OUT1}$, $V_{OUT2}$, and $V_{OUT3}$ occurs in that order, and later a power-down sequence occurs in the same order $V_{OUT1}$, $V_{OUT2}$, $V_{OUT3}$ as in the power-up sequence. Sequencer 100-4 includes first sequencer 10-1 labeled sequencer #1, a second sequencer 10-2 labeled sequencer #2, and a third sequencer 10-3 labeled sequencer #3, each of which may be the same as sequencer 10 shown in FIG. 2. The EN input of LDO #1 receives the external enable signal EN_EXT, which is also applied to the EN input of sequencer #1. The output $V_{OUT1}$ of LDO #1 is connected to the $V_{SENSE}$ input of sequencer #1. The PG and PD outputs of sequencer #1 are not connected or wire ORed together as in FIG. 4A, and the same is true for sequencer #2 and sequencer #3. The PG and PD outputs of sequencers #1, #2, and #3 each are connected to $V_{CC}$ by a corresponding resistor. The EN_PG input of sequencer #1 is connected to PD1, which also is connected by a resistor to $V_{CC}$. Similarly, the EN_PG input of sequencer #2 is connected to PD2. The EN_PG input of sequencer #3 is connected to EN_EXT. The EN_PG input of sequencer #1 also is connected to the EN input of sequencer #2. Similarly, the EN_PG input of sequencer #2 also is connected to the EN input of sequencer #3.

Multi-channel sequencer 100-4 in FIG. 8 may be constructed according to the general power-up sequence rule and the general power-down sequence rule explained above. As in multi-channel sequencer 100-2 of FIG. 4A, no enable delay circuit is used. EN_EXT is connected directly to the enable input of regulator #1, and also to the EN input of the first sequencer #1.

The described invention provides an inexpensive, simple, single-channel sequencer that can be interconnected with other like single-channel sequencers to provide multiple-channel sequencers having various desired power-up sequences and various desired power-down sequences for multiple supply voltage rails and provide monitoring of the occurrence of pre-determined upper and lower threshold levels of a supply voltage rail. The described embodiments of the invention avoid the cost of using complex digital multiple-channel sequencers which are capable of monitoring more voltage rails than are needed. Another advantage of the present invention is that it avoids problems caused by registers inside a state machine being switched by ambient electrical noise. The described embodiments of the invention can return to their previous states even despite the presence of large ambient noise signals because no logic states are stored except in the enable delay circuit 45, and a failure in enable circuit 45 failure causes the sequencer system to stop rather than continue to operate erroneously.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

For example, a single-rail and several three-rail embodiments are described, but the invention is not limited to those embodiments. The logic polarity of the various signals, such as EN, can be opposite to the polarities in the described embodiments. The $V_{SENSE}$ inputs for comparators 7 and 11 can be shared by using different feedback resistor integrated inside. The polarities of the comparator outputs can be reversed, depending on the logic circuitry coupled between the comparator outputs and the output transistors M40 and M41. Although various AND gates, NAND gates, and OR gates are disclosed herein, it is to be understood that by way of definition, the term "ORing gate" used herein is intended to encompass either an OR gate or a NOR gate, and the term "ANDing gate" used herein is intended to encompass either an AND gate or a NAND gate.

What is claimed is:

1. Supply voltage sequencing circuitry comprising:
   (a) first circuitry for comparing an upper target threshold with a first supply voltage;
   (b) second circuitry for comparing a lower target threshold with the first supply voltage;
   (c) first logic circuitry for producing an active level of a first output signal on a first output in response to an output of the first circuitry if the first supply voltage exceeds the upper target threshold while a first control signal on a first control input is at an active level, the first logic circuitry also being operative to produce an inactive level of the first output signal in response to an inactive level of the first control signal, the first logic circuitry also being operative to latch a logic level representative of the first output signal when a second control signal on a second control input is at an inactive level; and
   (d) second logic circuitry for producing an inactive level of a second output signal on a second output in response to the output of the second circuitry if the first supply voltage is less than the lower target threshold during the inactive level of the second control signal, the second logic circuitry also being operative to produce an active level of the second output signal in response to the active level of the second control signal.

2. The supply voltage sequencing circuitry of claim 1 wherein the first circuitry includes a first comparator circuit for comparing an upper target threshold with a first supply voltage, and wherein the second circuitry includes a second comparator circuit for comparing a lower target threshold with the first supply voltage.

3. The supply voltage sequencing circuitry of claim 2 wherein
   (1) the first logic circuitry includes a first ORing circuit having a first input coupled to the output of the first comparator circuit, a first ANDing circuit having a first input coupled to the second control signal and an output coupled to a second input of the first ORing circuit, a second ANDing circuit having a first input coupled to an output of the first ORing circuit and a second input coupled to the first control signal, and an output representative of the first output signal coupled to a second input of the first ANDing circuit, and
   (2) the second logic circuitry includes a second ORing circuit having a first input coupled to the output of the second comparator circuit, a second input coupled to the second control signal, and an output representative of the second output signal.

4. The supply voltage sequencing circuitry of claim 3 including a first transistor having a gate coupled to the output of the second ANDing circuit, a source coupled to a first reference voltage, and a drain coupled to the first output signal, and a second transistor having a gate coupled to the output of the second ORing circuit, a source coupled to the first reference voltage, and a drain coupled to the second output signal.

5. The supply voltage sequencing circuitry of claim 4 wherein the gate of the first transistor is coupled to the output of the second ANDing circuit by means of a rising-edge-only delay circuit, and wherein the gate of the second transistor is coupled to the output of the second ORing circuit by means of a falling-edge-only delay circuit.

6. The supply voltage sequencing circuitry of claim 4 including a pull-down transistor having a source coupled to the first reference voltage, a gate coupled to the first input of the first ANDing circuit, and a drain coupled to the first supply voltage.

7. The supply voltage sequencing circuitry of claim 4 wherein a first input of the first comparator circuit is coupled to a scaled-down representation of the first supply voltage, a second input of the first comparator circuit is coupled to a second reference voltage representative of an upper percentage of a target value of the first supply voltage, a first (+) input of the second comparator circuit is coupled to the first supply voltage, and a second input of the second comparator circuit is coupled to a third reference voltage representative of a lower percentage of the target value of the first supply voltage.

8. The supply voltage sequencing circuitry of claim 2 including an enable delay circuit having a first input coupled to the second output signal, a second input coupled to receive an external enable signal, and an output for conducting a voltage regulator enable signal.

9. The supply voltage sequencing circuitry of claim 2 wherein the first logic circuitry includes a first delay circuit coupled in a first circuit path between the output of the first comparator circuit and the first output signal, wherein the first delay circuit is selected from the group comprising a rising-edge-only delay circuit and a falling-edge-only delay circuit, and wherein the second logic circuitry includes a second delay circuit coupled in a second circuit path between the output of the second comparator circuit and the second output signal, wherein the second delay circuit is selected from the group comprising a rising-edge-only delay circuit and a falling-edge-only delay circuit.

10. The supply voltage sequencing circuitry of claim 2 wherein the first comparator circuit, second comparator circuit, first logic circuitry, and second logic circuitry are included in a first sequencer for monitoring the first supply voltage, and wherein the supply voltage sequencing circuitry also includes
    (1) second and third sequencers each also including a first comparator circuit, a second comparator circuit, first logic circuitry, and the second logic circuitry as in the first sequencer,
    (2) first, second, and third voltage regulators each having an enable input, an output of the first voltage regulator producing the first supply voltage for the first sequencer, an output of the second voltage regulator producing a second supply voltage for being monitored by the second sequencer, and an output of the third voltage regulator producing a third supply voltage for being monitored by the third sequencer, and (3) wherein the first output signal of the first sequencer is coupled to the enable input of the second voltage regulator, and the first output signal of the second sequencer is coupled to the enable input of the third voltage regulator.

11. The supply voltage sequencing circuitry of claim 10 wherein the first sequencer is the first sequencer in a power-up sequence of the first, second, and third supply voltages and also is the first sequencer in a power-down sequence of the first, second, and third supply voltages, wherein the second output signal of a first sequencer in the power-down sequence is coupled to (a) the first control input of a sequencer the first output of which drives the enable input of the voltage regulator producing the supply voltage which is monitored by a second sequencer in the power-down sequence, and (b) the second input of the second sequencer in the power-down sequence, wherein the second output signal of the second sequencer in the power-down sequence is coupled to the first control input of a sequencer the first output of which drives an enable input of the voltage regulator producing the supply voltage which is monitored by a third sequencer in the power-down sequence, wherein the second output signal of the second sequencer in the power-down sequence is also coupled to the second control input of the third sequencer in the power-down sequence, and an external enable signal is coupled to the enable input of the first voltage regulator and to the second control input of the first sequencer.

12. The supply voltage sequencing circuitry of claim 10 wherein the first sequencer is the first sequencer in a power-up sequence of the first, second, and third supply voltages but is not the first sequencer in a power-down sequence of the first, second, and third supply voltages, the supply voltage sequencing circuitry including an enable delay circuit having a first input, a second input, and an output coupled to the enable input of the first voltage regulator, wherein the second output signal of a first sequencer in the power-down sequence is coupled to the first control input of a sequencer an output of which drives the enable input of the voltage regulator producing the supply voltage which is monitored by a second sequencer in the power-down sequence, and also is coupled to the second input of the second sequencer in the power-down sequence, wherein the second output of the second sequencer in the power-down sequence is coupled to the first control input of a sequencer the first output of which drives an enable input of the voltage regulator producing the supply voltage which is monitored by a third sequencer in the power-down sequence, wherein the second output signal of the second sequencer in the power-down sequence is also coupled to the second control input of the third sequencer in the power-down sequence, wherein an external enable signal is coupled to the second input of the enable delay circuit and also is coupled to the first control input of the sequencer the first output of which is coupled to the enable input of the voltage regulator which produces the supply voltage being monitored by the first sequencer in the power-down sequence, and wherein the external enable signal also is coupled to the second control input of the first sequencer in the power-down sequence.

13. The supply voltage sequencing circuitry of claim 10 wherein the first sequencer is the first sequencer in a power-up sequence of the first, second, and third supply voltages and also is the first sequencer in a power-down sequence of the first, second, and third supply voltages, and wherein the second output signal of the first sequencer is coupled to the first output signal of the first sequencer and to the second control signal of the second sequencer, the second output signal of the second sequencer is coupled to the first output signal of the second sequencer and to the second control signal of the third sequencer, and the second output signal of the third sequencer is coupled to the first output signal of the third sequencer.

14. The supply voltage sequencing circuitry of claim 10 wherein the voltage regulators are LDO (low drop out) voltage regulators.

15. The supply voltage sequencing circuitry of claim 12 wherein the enable delay circuit includes a first NAND gate having an output coupled to a first input of a second NAND gate, the second NAND gate having an output coupled to a first input of the first NAND gate, the output of the second NAND gate being coupled to the enable input of the first voltage regulator, a second input of the first NAND gate being coupled to an output of an OR gate, a second input of the second NAND gate being coupled to an output of an inverter, a first input of the OR gate being coupled to the second input of the enable delay circuit, a second input of the OR gate and an input of the inverter being coupled to the first input of the enable delay circuit.

16. A method of generating signals for controlling powering up and powering down of a first supply voltage by means of a first sequencer, the method comprising:

(a) monitoring an upper target threshold of a first supply voltage;

(b) producing an active level of a first output signal on a first output of the first sequencer in response to the monitoring of the upper target threshold voltage if the first supply voltage exceeds the upper target threshold while a first control signal on a first control input of the first sequencer is at an active level;

(c) monitoring a lower target threshold of the first supply voltage;

(d) producing an inactive level of a second output signal on a second output of the first sequencer in response to the monitoring of a lower target threshold if the first supply voltage is less than the lower target threshold during an inactive level of a second control signal on a second control input of the first sequencer;

(e) producing an inactive level of the first output signal in response to an inactive level of the first control signal; and (f) latching the level of the first output signal whenever the inactive level of the second control signal occurs.

17. The method of claim 16 further including controlling powering up of the first supply voltage, a second supply voltage and a third supply voltage, wherein the first, second, and third supply voltages are produced by first, second, and third voltage regulators, respectively, wherein steps (a)-(f) are performed by each of first, second, and third sequencers which monitor the first, second, and third supply voltages, respectively, the method further including providing an enable signal to an enable input of the first voltage regulator and providing the second control signal of the first sequencer, coupling the first output signal of the first sequencer to an enable input of the second voltage regulator, and coupling the first output signal of the second sequencer to an enable input of the third voltage regulator.

18. The method of claim 17 wherein the first sequencer is the first sequencer in a power-up sequence of the first, second, and third supply voltages but is not the first sequencer in a power-down sequence of the first, second, and third supply voltages, the method including providing an enable delay circuit having a first input, a second input, and an output coupled to an enable input of the first voltage regulator, coupling the second output signal of a first sequencer in the power-down sequence to the first control input of a sequencer an output of which drives the enable input of the voltage regulator producing the supply voltage which is monitored by a second sequencer in the power-down sequence, and also coupling the second output signal of the first sequencer in the power-down sequence to the second input of the second sequencer in the power-down sequence, coupling the second output signal of the second sequencer in the power-down sequence to the first control input of a sequencer the first output of which drives an enable input of the voltage regulator producing the supply voltage which is monitored by a third sequencer in the power-down sequence, coupling the second output signal of the second sequencer in the power-down sequence to the second control input of the third sequencer in the power-down sequence, coupling an external enable signal to the second input of the enable delay circuit and also to the first control input of the sequencer the first output of which is coupled to the enable input of the voltage regulator which produces the supply voltage being monitored by the first sequencer in the power-down sequence, and coupling the external enable signal to the second control input of the first sequencer in the power-down sequence.

19. The method of claim 17 wherein the first sequencer is the first sequencer in a power-up sequence of the first, second, and third supply voltages and also is the first sequencer in a power-down sequence of the first, second, and third supply voltages, the method including coupling the second output signal of a first sequencer in the power-down sequence to the first control input of a sequencer of the first output of which drives the enable input of the voltage regulator producing the supply voltage which is monitored by a second sequencer in the power-down sequence, and also coupling the second output signal of the first sequencer in the power-down sequence to the second input of the second sequencer in the power-down sequence, coupling the second output signal of the second sequencer in the power-down sequence to the first control input of a sequencer the first output of which drives an enable input of the voltage regulator producing the supply voltage which is monitored by the third sequencer in the power-down sequence, coupling the second output signal of the second sequencer in the power-down sequence to the second control input of the third sequencer in the power-down sequence, and, coupling an external enable signal to the enable input of the first voltage regulator and to the second control input of the first sequencer.

20. The method of claim 17 wherein the first sequencer is the first sequencer in a power-up sequence of the first, second, and third supply voltages and also is the first sequencer in a power-down sequence of the first, second, and third supply voltages, the method including coupling the second output signal of the first sequencer to the first output of the first sequencer and to the second control input of the second sequencer, coupling the second output signal of the second sequencer to the first output of the second sequencer and to the second control input of the third sequencer, and coupling the second output signal of the third sequencer to the first output of the third sequencer.

21. A circuit for generating signals for controlling powering up and powering down of a first supply voltage, the circuit comprising:

(a) means for monitoring an upper target threshold of a first supply voltage;

(b) means for producing an active level of a first output signal on a first output of the first sequencer in response to the monitoring of the upper target threshold voltage if the first supply voltage exceeds the upper target threshold while a first control signal on a first control input of the first sequencer is at an active level;

(c) means for monitoring a lower target threshold of the first supply voltage;

(d) means for producing an inactive level of a second output signal on a second output of the first sequencer in response to the monitoring of a lower target threshold if the first supply voltage is less than the lower target threshold during an inactive level of a second control signal on a second control input of the first sequencer;

(e) means for producing an inactive level of the first output signal in response to an inactive level of the first control signal; and (f) means for latching the level of the first output signal whenever the inactive level of the second control signal occurs.

* * * * *